United States Patent
Kuzuhara et al.

(10) Patent No.: US 9,488,813 B2
(45) Date of Patent: Nov. 8, 2016

(54) ZOOM LENS SYSTEM, INTERCHANGEABLE LENS APPARATUS AND CAMERA SYSTEM

(71) Applicant: Panasonic Intellectual Property Management Co., Ltd., Osaka (JP)

(72) Inventors: Satoshi Kuzuhara, Hyogo (JP); Tsuneo Uchida, Chiba (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/818,156

(22) Filed: Aug. 4, 2015

(65) Prior Publication Data

US 2015/0338622 A1    Nov. 26, 2015

Related U.S. Application Data

(63) Continuation of application No. PCT/JP2014/000803, filed on Feb. 17, 2014.

(30) Foreign Application Priority Data

Feb. 19, 2013  (JP) ................ 2013-029605

(51) Int. Cl.
*G02B 15/14* (2006.01)
*G02B 15/20* (2006.01)
(Continued)

(52) U.S. Cl.
CPC ............. *G02B 15/20* (2013.01); *G02B 7/10* (2013.01); *G02B 7/14* (2013.01); *G02B 13/009* (2013.01);
(Continued)

(58) Field of Classification Search
CPC .. G02B 15/173; G02B 15/177; G02B 15/17; G02B 15/14
USPC ................. 359/676, 677, 683, 642
See application file for complete search history.

(56) References Cited

U.S. PATENT DOCUMENTS

2005/0275949 A1* 12/2005 Fujimoto et al. ............ 359/685
2006/0268428 A1   11/2006 Kuroda et al.
(Continued)

FOREIGN PATENT DOCUMENTS

JP   2004-317867 A   11/2004
JP   2005-352057 A   12/2005
(Continued)

OTHER PUBLICATIONS

International Search Report issued in corresponding International Patent Application No. PCT/JP2014/000803, on May 20, 2014; 4 pages with English translation.

*Primary Examiner* — James Greece
(74) *Attorney, Agent, or Firm* — McDermott Will & Emery LLP

(57) ABSTRACT

A zoom lens system comprising a positive first lens unit; a negative second lens unit; and subsequent five or six lens units, wherein an aperture diaphragm is provided, intervals between the adjacent lens units vary in zooming, the first lens unit moves in zooming and is fixed in focusing, and the conditions: $BF/f_W<0.66$, $D_A/L_W>0.42$, and $D_{AIR}/Y<2.00$ (BF: distance from an image-side surface apex of a most-image-side lens element to an image surface, $f_W$: focal length of system at wide-angle limit, $D_A$: sum of optical axial thicknesses of the lens units in system, $L_W$: overall length of system at wide-angle limit, $D_{AIR}$: maximum of air spaces between the lens elements constituting system at wide-angle limit, $Y=f_T \times \tan(\omega_T)$, $f_T$: focal length of system at telephoto limit, $\omega_T$: half view angle at telephoto limit) are satisfied.

16 Claims, 19 Drawing Sheets

(51) Int. Cl.
*G02B 15/16* (2006.01)
*G02B 27/64* (2006.01)
*G02B 7/10* (2006.01)
*G02B 7/14* (2006.01)
*H04N 5/232* (2006.01)
*H04N 5/225* (2006.01)
*G02B 13/00* (2006.01)
*G02B 15/173* (2006.01)

(52) U.S. Cl.
CPC ............ *G02B 15/16* (2013.01); *G02B 15/173* (2013.01); *G02B 27/646* (2013.01); *H04N 5/2254* (2013.01); *H04N 5/23296* (2013.01)

(56) References Cited

U.S. PATENT DOCUMENTS

| | | |
|---|---|---|
| 2012/0026602 A1 | 2/2012 | Uchida et al. |
| 2012/0050603 A1 | 3/2012 | Imaoka et al. |
| 2013/0120852 A1 | 5/2013 | Sato |

FOREIGN PATENT DOCUMENTS

| | | |
|---|---|---|
| JP | 2006-301474 A | 11/2006 |
| JP | 2007-033643 A | 2/2007 |
| JP | 2011-090099 A | 5/2011 |
| JP | 2011-090186 A | 5/2011 |
| JP | 2012-047814 A | 3/2012 |
| JP | 2012-053444 A | 3/2012 |
| JP | 2013-105053 A | 5/2013 |

* cited by examiner

ZOOM LENS SYSTEM, INTERCHANGEABLE LENS APPARATUS AND CAMERA SYSTEM

CROSS-REFERENCE TO RELATED APPLICATION

This application is a Continuation of International Application No. PCT/JP2014/000803, filed on Feb. 17, 2014, which in turn claims the benefit of Japanese Application No. 2013-029605, filed on Feb. 19, 2013, the disclosures of which Applications are incorporated by reference herein.

BACKGROUND

1. Field

The present disclosure relates to zoom lens systems, interchangeable lens apparatuses, and camera systems.

2. Description of the Related Art

In recent years, interchangeable-lens type digital camera systems (also referred to simply as "camera systems", hereinafter) have been spreading rapidly. Such interchangeable-lens type digital camera systems realize: taking of high-sensitive and high-quality images; high-speed focusing and high-speed image processing after image taking; and easy replacement of an interchangeable lens apparatus in accordance with a desired scene. Meanwhile, an interchangeable lens apparatus having a zoom lens system that forms an optical image with variable magnification is popular because it allows free change of focal length.

Japanese Laid-Open Patent Publication No. 2011-090186 discloses an inner focus type zoom lens system having a six-unit configuration of positive, negative, positive, negative, positive, and negative, in which focusing is performed by the third lens unit.

Japanese Laid-Open Patent Publication No. 2012-047814 discloses an inner focus type zoom lens system having a six-unit configuration of positive, negative, positive, negative, negative, and positive, in which focusing is performed by a plurality of lens units.

SUMMARY

The present disclosure provides a compact zoom lens system having excellent optical performance, in which chromatic aberration is sufficiently compensated. Further, the present disclosure provides an interchangeable lens apparatus and a camera system each employing the zoom lens system.

The novel concepts disclosed herein were achieved in order to solve the foregoing problems in the related art, and herein is disclosed:

a zoom lens system comprising lens units each being composed of at least one lens element, the zoom lens system, in order from an object side to an image side, comprises:

a first lens unit located closest to the object side, and having positive optical power;

a second lens unit having negative optical power; and subsequent five or six lens units, wherein an aperture diaphragm is provided, intervals between the adjacent lens units vary in zooming from a wide-angle limit to a telephoto limit at a time of image taking, the first lens unit moves along an optical axis in the zooming and is fixed with respect to an image surface in focusing from an infinity in-focus condition to a close-object in-focus condition, and the following conditions (1), (2), and (3) are satisfied:

$$BF/f_W < 0.66 \quad (1)$$

$$D_A/L_W > 0.42 \quad (2)$$

$$D_{AIR}/Y < 2.00 \quad (3)$$

where

BF is a distance from an apex of an image side surface of a lens element located closest to the image side, to the image surface, $f_W$ is a focal length of the zoom lens system at the wide-angle limit, $D_A$ is a sum of optical axial thicknesses of the lens units in the zoom lens system, $L_W$ is an overall length of the lens system at the wide-angle limit, which is an optical axial distance from an object side surface of a lens element located closest to the object side to the image surface at the wide-angle limit, $D_{AIR}$ is a maximum value of air spaces between the lens elements constituting the lens system at the wide-angle limit, Y is a maximum image height expressed by the following formula:

$$Y = f_T \times \tan(\omega_T),$$

$f_T$ is a focal length of the zoom lens system at the telephoto limit, and $\omega_T$ is a half value (°) of a maximum view angle at the telephoto limit The novel concepts disclosed herein were achieved in order to solve the foregoing problems in the related art, and herein is disclosed:

an interchangeable lens apparatus comprising:

a zoom lens system; and a lens mount section which is connectable to a camera body including an image sensor for receiving an optical image formed by the zoom lens system and converting the optical image into an electric image signal, wherein the zoom lens system comprising lens units each being composed of at least one lens element, the zoom lens system, in order from an object side to an image side, comprises:

a first lens unit located closest to the object side, and having positive optical power;

a second lens unit having negative optical power; and subsequent five or six lens units, wherein an aperture diaphragm is provided, intervals between the adjacent lens units vary in zooming from a wide-angle limit to a telephoto limit at a time of image taking, the first lens unit moves along an optical axis in the zooming and is fixed with respect to an image surface in focusing from an infinity in-focus condition to a close-object in-focus condition, and the following conditions (1), (2), and (3) are satisfied:

$$BF/f_W < 0.66 \quad (1)$$

$$D_A/L_W > 0.42 \quad (2)$$

$$D_{AIR}/Y < 2.00 \quad (3)$$

where

BF is a distance from an apex of an image side surface of a lens element located closest to the image side, to the image surface, $f_W$ is a focal length of the zoom lens system at the wide-angle limit, $D_A$ is a sum of optical axial thicknesses of the lens units in the zoom lens system, $L_W$ is an overall length of the lens system at the wide-angle limit, which is an optical axial distance from an object side surface of a lens element located closest to the object side to the image surface at the wide-angle limit, $D_{AIR}$ is a maximum value of air spaces between the lens elements constituting the lens system at the wide-angle limit, Y is a maximum image height expressed by the following formula:

$$Y = f_T \times \tan(\omega_T),$$

$f_T$ is a focal length of the zoom lens system at the telephoto limit, and $\omega_T$ is a half value (°) of a maximum view angle at the telephoto limit The novel concepts disclosed herein were achieved in order to solve the foregoing problems in the related art, and herein is disclosed:

a camera system comprising:

an interchangeable lens apparatus including a zoom lens system; and a camera body which is detachably connected to the interchangeable lens apparatus via a camera mount section, and includes an image sensor for receiving an optical image formed by the zoom lens system and converting the optical image into an electric image signal, wherein the zoom lens system comprising lens units each being composed of at least one lens element, the zoom lens system, in order from an object side to an image side, comprises:

a first lens unit located closest to the object side, and having positive optical power;

a second lens unit having negative optical power; and subsequent five or six lens units, wherein an aperture diaphragm is provided, intervals between the adjacent lens units vary in zooming from a wide-angle limit to a telephoto limit at a time of image taking, the first lens unit moves along an optical axis in the zooming and is fixed with respect to an image surface in focusing from an infinity in-focus condition to a close-object in-focus condition, and the following conditions (1), (2), and (3) are satisfied:

$$BF/f_W < 0.66 \qquad (1)$$

$$D_A/L_W > 0.42 \qquad (2)$$

$$D_{AIR}Y < 2.00 \qquad (3)$$

where

BF is a distance from an apex of an image side surface of a lens element located closest to the image side, to the image surface, $f_W$ is a focal length of the zoom lens system at the wide-angle limit, $D_A$ is a sum of optical axial thicknesses of the lens units in the zoom lens system, $L_W$ is an overall length of the lens system at the wide-angle limit, which is an optical axial distance from an object side surface of a lens element located closest to the object side to the image surface at the wide-angle limit, $D_{AIR}$ is a maximum value of air spaces between the lens elements constituting the lens system at the wide-angle limit, Y is a maximum image height expressed by the following formula:

$$Y = f_T \times \tan(\omega_T),$$

$f_T$ is a focal length of the zoom lens system at the telephoto limit, and $\omega_T$ is a half value (°) of a maximum view angle at the telephoto limit.

The zoom lens system according to the present disclosure is compact and has excellent optical performance, and chromatic aberration thereof is sufficiently compensated.

BRIEF DESCRIPTION OF THE DRAWINGS

This and other objects and features of the present disclosure will become clear from the following description, taken in conjunction with the exemplary embodiments with reference to the accompanied drawings in which.

DETAILED DESCRIPTION

Figure 1:
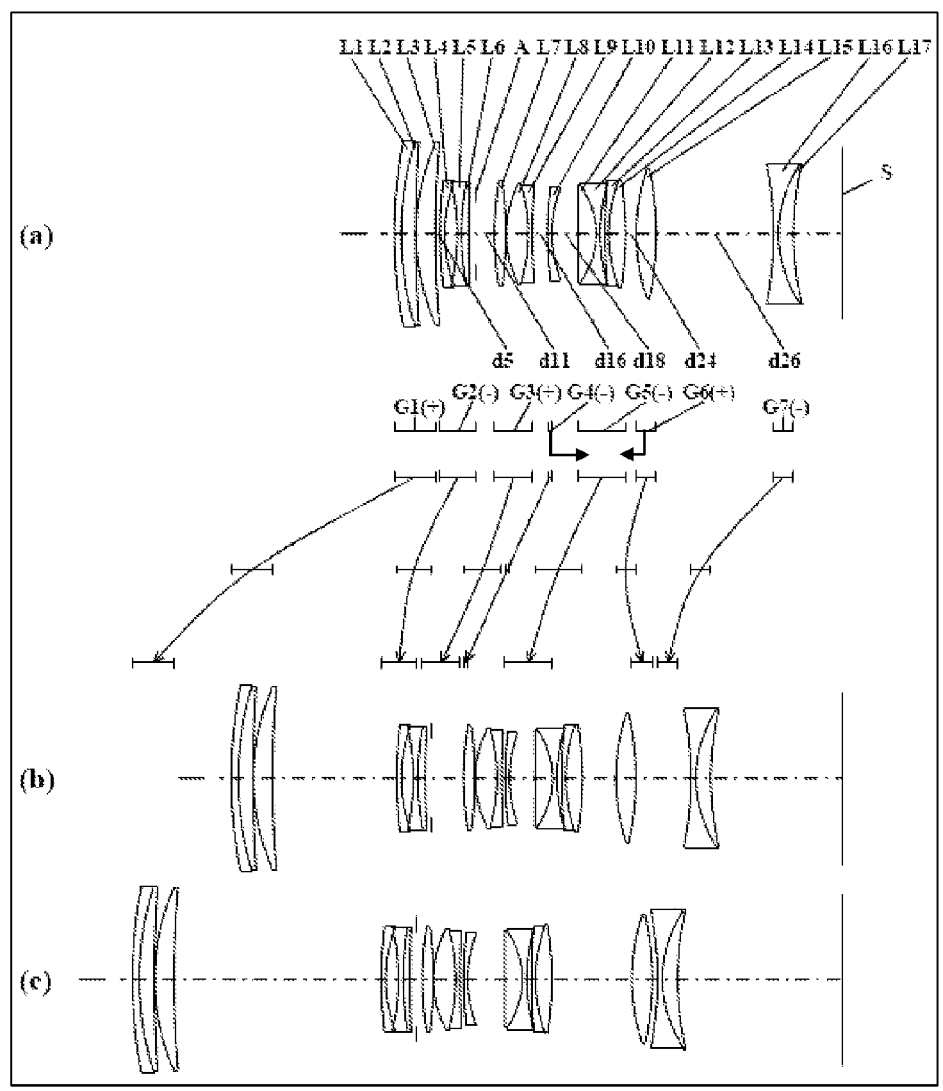
FIG. 1 is a lens arrangement diagram showing an infinity in-focus condition of a zoom lens system according to Embodiment 1 (Numerical Example 1)
Figure 2:
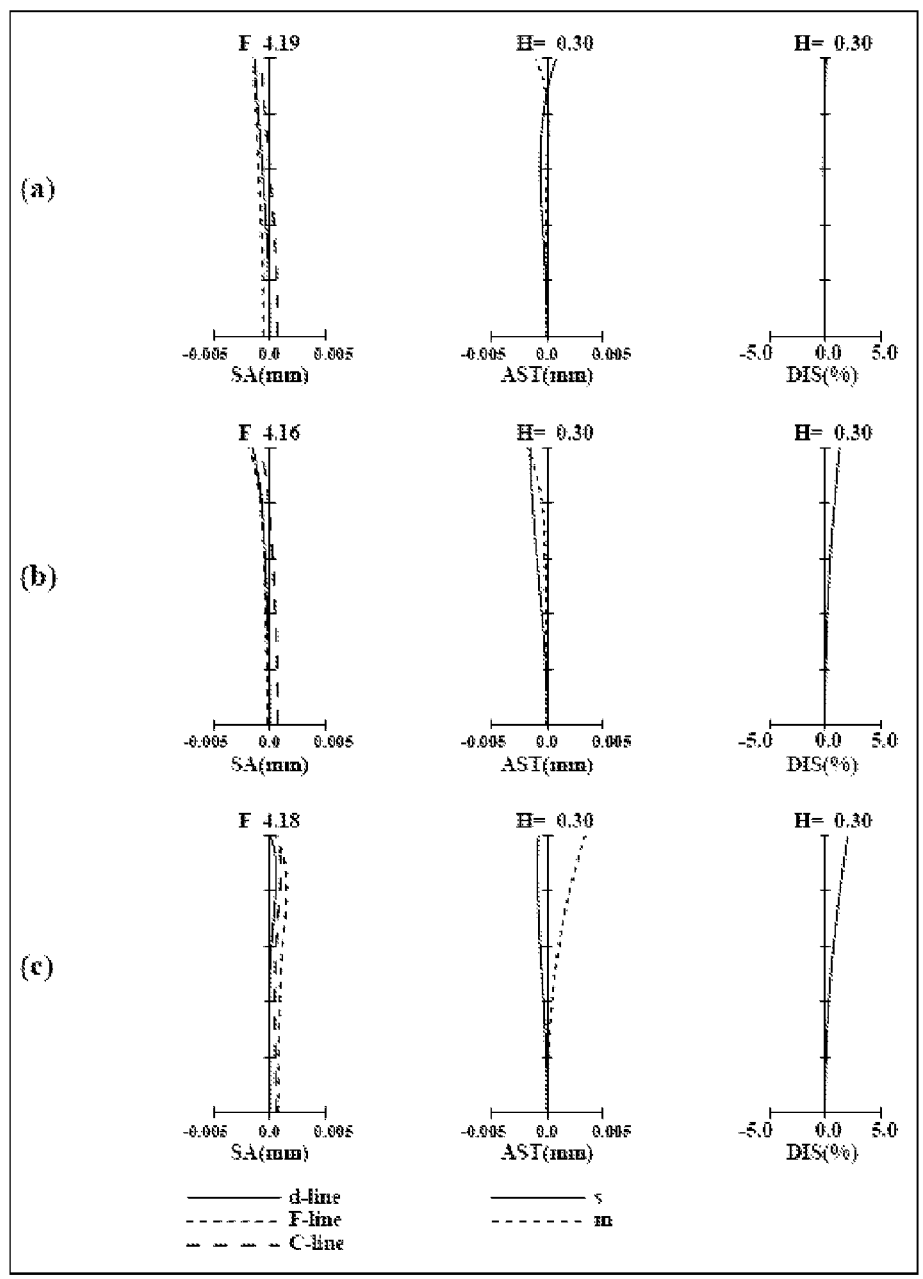
FIG. 2 is a longitudinal aberration diagram of an infinity in-focus condition of the zoom lens system according to Numerical Example 1.
Figure 3:
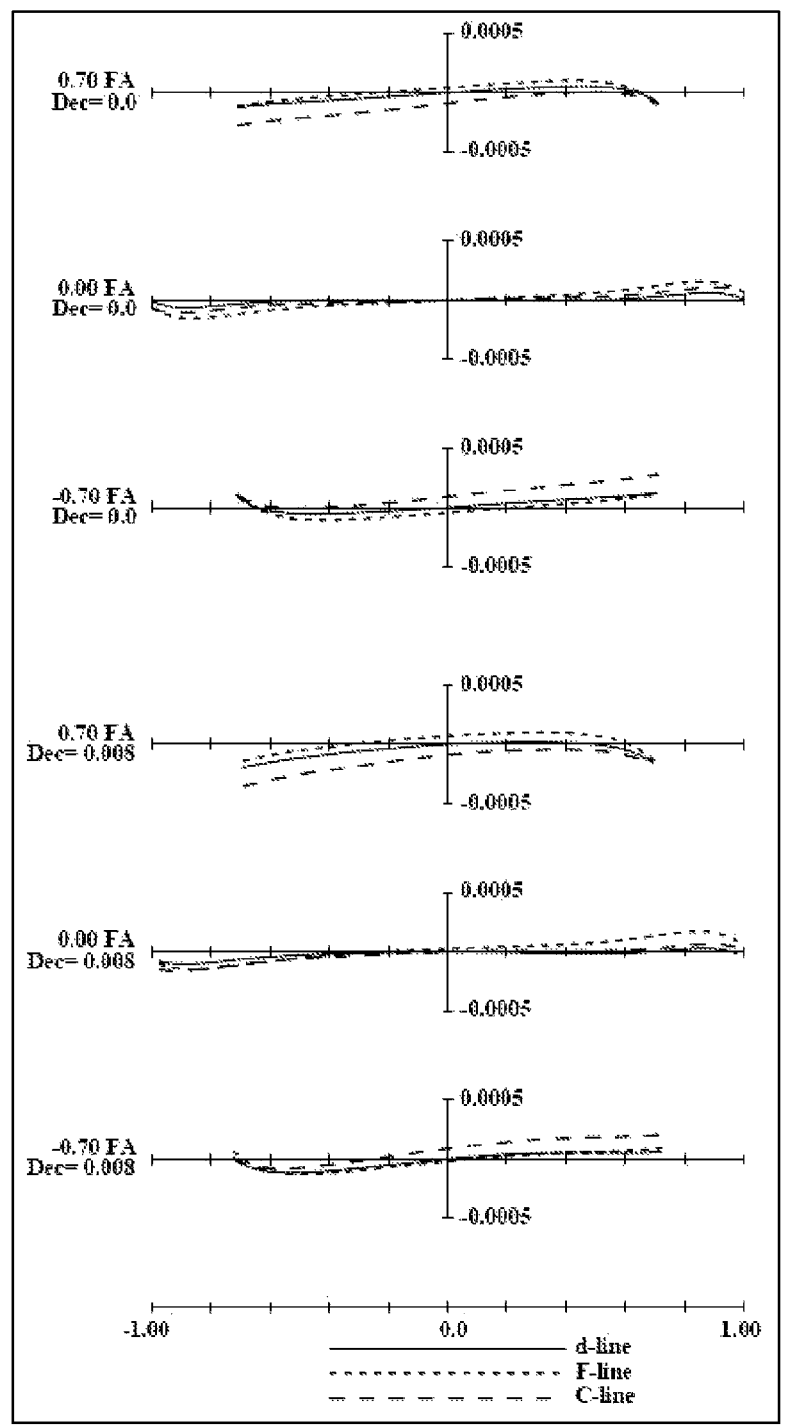
FIG. 3 is a lateral aberration diagram of the zoom lens system according to Numerical Example 1 at a telephoto limit in a basic state where image blur compensation is not performed and in an image blur compensation state.

Hereinafter, embodiments will be described with reference to the drawings as appropriate. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description so that those skilled in the art can fully understand this disclosure. Therefore, the drawings and description are not intended to limit the subject defined by the claims.

Embodiments 1 to 6

FIGS. 1, 4, 7, 10, 13, and 16 are lens arrangement diagrams of zoom lens systems according to Embodiments 1 to 6, respectively. Each zoom lens system is in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). In each Fig., each straight or curved arrow located between part (a) and part (b) indicates motion of each lens unit from the wide-angle limit to the telephoto limit through a middle position. In the part between the wide-angle limit and the middle position and the part between the middle position and the telephoto limit, the positions are connected simply with a straight line, and hence this line does not indicate actual motion of each lens unit.

Further, in each Fig., an arrow imparted to a lens unit indicates focusing from an infinity in-focus condition to a close-object in-focus condition. That is, the arrow indicates a direction along which the lens unit moves in focusing from the infinity in-focus condition to the close-object in-focus condition.

Each of the zoom lens systems according to Embodiments 1 to 6, in order from the object side to the image side, comprises a first lens unit G1 having positive optical power, a second lens unit G2 having negative optical power, and a subsequent lens unit GR. In zooming from a wide-angle limit to a telephoto limit at the time of image taking, the first lens unit G1 and the second lens unit G2 individually move in a direction along the optical axis such that the interval between the first lens unit G1 and the second lens unit G2 varies. In the zoom lens systems according to each embodiment, these lens units are arranged in a desired optical power allocation, whereby size reduction of the entire lens system is achieved while maintaining excellent optical performance.

In FIGS. 1, 4, 7, 10, 13, and 16, an asterisk "*" imparted to a particular surface indicates that the surface is aspheric. In each Fig., symbol (+) or (−) imparted to the symbol of each lens unit corresponds to the sign of the optical power of the lens unit. In each Fig., a straight line located on the most right-hand side indicates the position of an image surface S.

Embodiment 1

As shown in FIG. 1, the zoom lens system according to Embodiment 1, in order from the object side to the image side, comprises a first lens unit G1 having positive optical power, a second lens unit G2 having negative optical power, a third lens unit G3 having positive optical power, a fourth lens unit G4 having negative optical power, a fifth lens unit G5 having negative optical power, a sixth lens unit G6 having positive optical power, and a seventh lens unit G7 having negative optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; a positive meniscus sixth lens element L6 with the convex surface facing the object side; and an aperture diaphragm A. Among these, the fifth lens element L5 and the sixth lens element L6 are cemented with each other.

The third lens unit G3, in order from the object side to the image side, comprises: a bi-convex seventh lens element L7; a bi-convex eighth lens element L8, and a bi-concave ninth lens element L9. Among these, the eighth lens element L8 and the ninth lens element L9 are cemented with each other.

The fourth lens unit G4 comprises solely a negative meniscus tenth lens element L10 with the convex surface facing the object side.

The fifth lens unit G5, in order from the object side to the image side, comprises: a positive meniscus eleventh lens element L11 with the convex surface facing the image side; a bi-concave twelfth lens element L12; a negative meniscus thirteenth lens element L13 with the convex surface facing the object side; and a bi-convex fourteenth lens element L14. Among these, the eleventh lens element L11 and the twelfth lens element L12 are cemented with each other, and the thirteenth lens element L13 and the fourteenth lens element L14 are cemented with each other.

The sixth lens unit G6 comprises solely a bi-convex fifteenth lens element L15.

The seventh lens unit G7, in order from the object side to the image side, comprises: a bi-concave sixteenth lens element L16; and a positive meniscus seventeenth lens element L17 with the convex surface facing the object side. The sixteenth lens element L16 and the seventeenth lens element L17 are cemented with each other.

In the zoom lens system according to Embodiment 1, in zooming from the wide-angle limit to the telephoto limit at the time of image taking, the first lens unit G1, the second lens unit G2, the third lens unit G3, the fourth lens unit G4, the fifth lens unit G5, and the seventh lens unit G7 monotonically move to the object side, and the sixth lens unit G6 moves with locus of a convex to the object side.

In the zoom lens system according to Embodiment 1, in focusing from the infinity in-focus condition to the close-object in-focus condition, the fourth lens unit G4 moves to the image side along the optical axis, and the sixth lens unit G6 moves to the object side along the optical axis.

In the zoom lens system according to Embodiment 1, the second lens unit G2 corresponds to an image blur compensating lens unit that moves in a direction perpendicular to the optical axis to optically compensate image blur.

Embodiment 2

Figure 4:
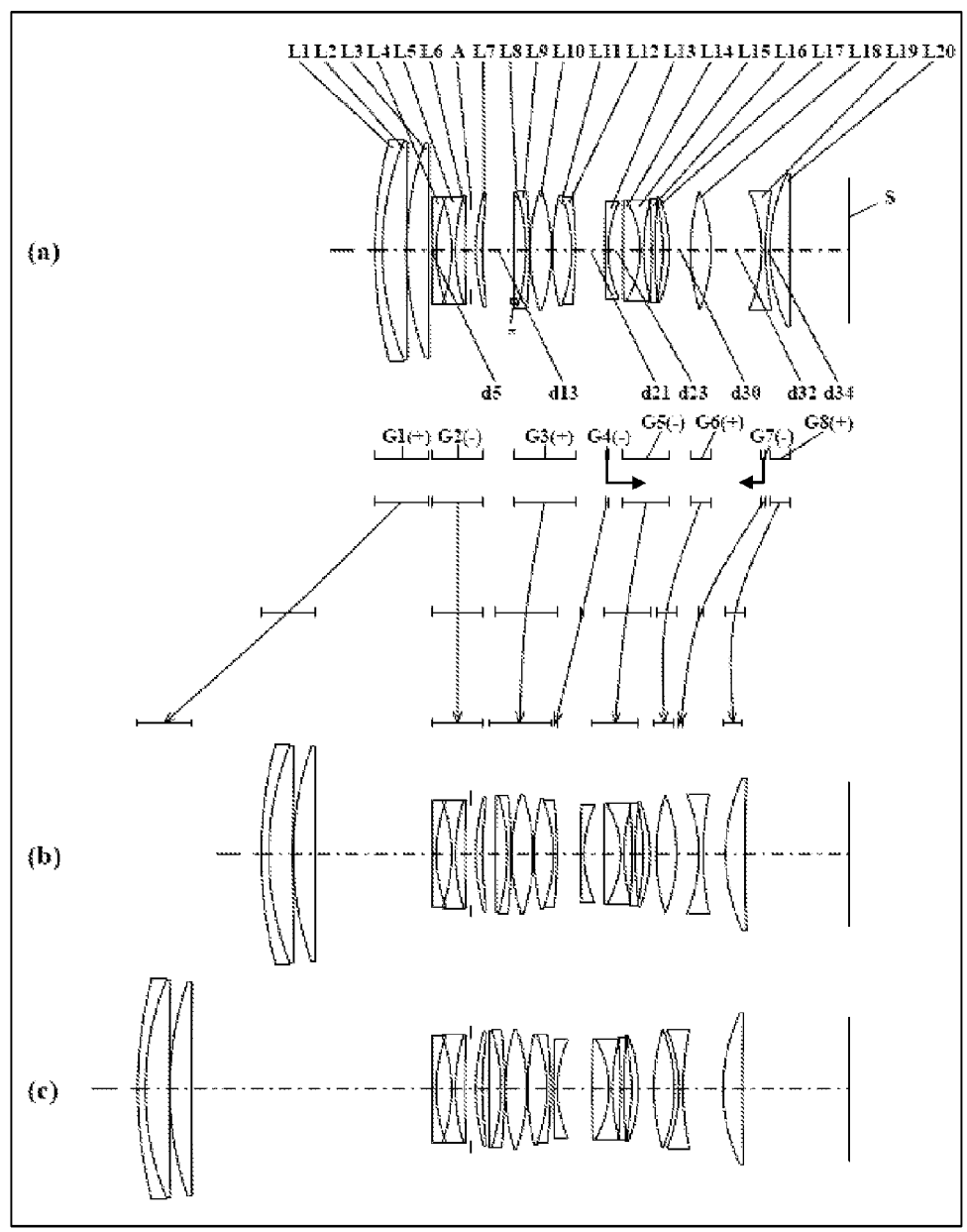
FIG. 4 is a lens arrangement diagram showing an infinity in-focus condition of a zoom lens system according to Embodiment 2 (Numerical Example 2)
Figure 5:
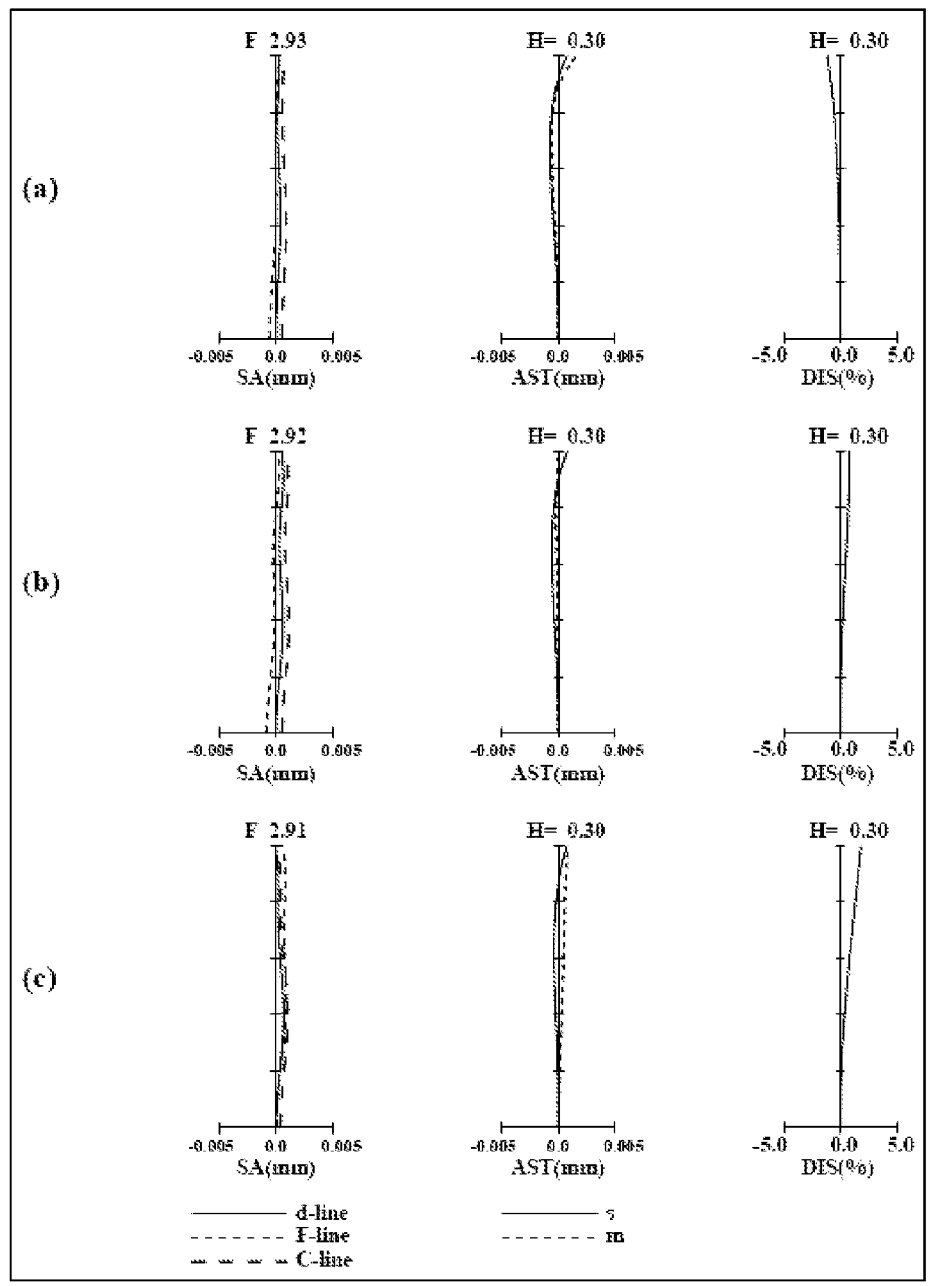
FIG. 5 is a longitudinal aberration diagram of an infinity in-focus condition of the zoom lens system according to Numerical Example 2.
Figure 6:
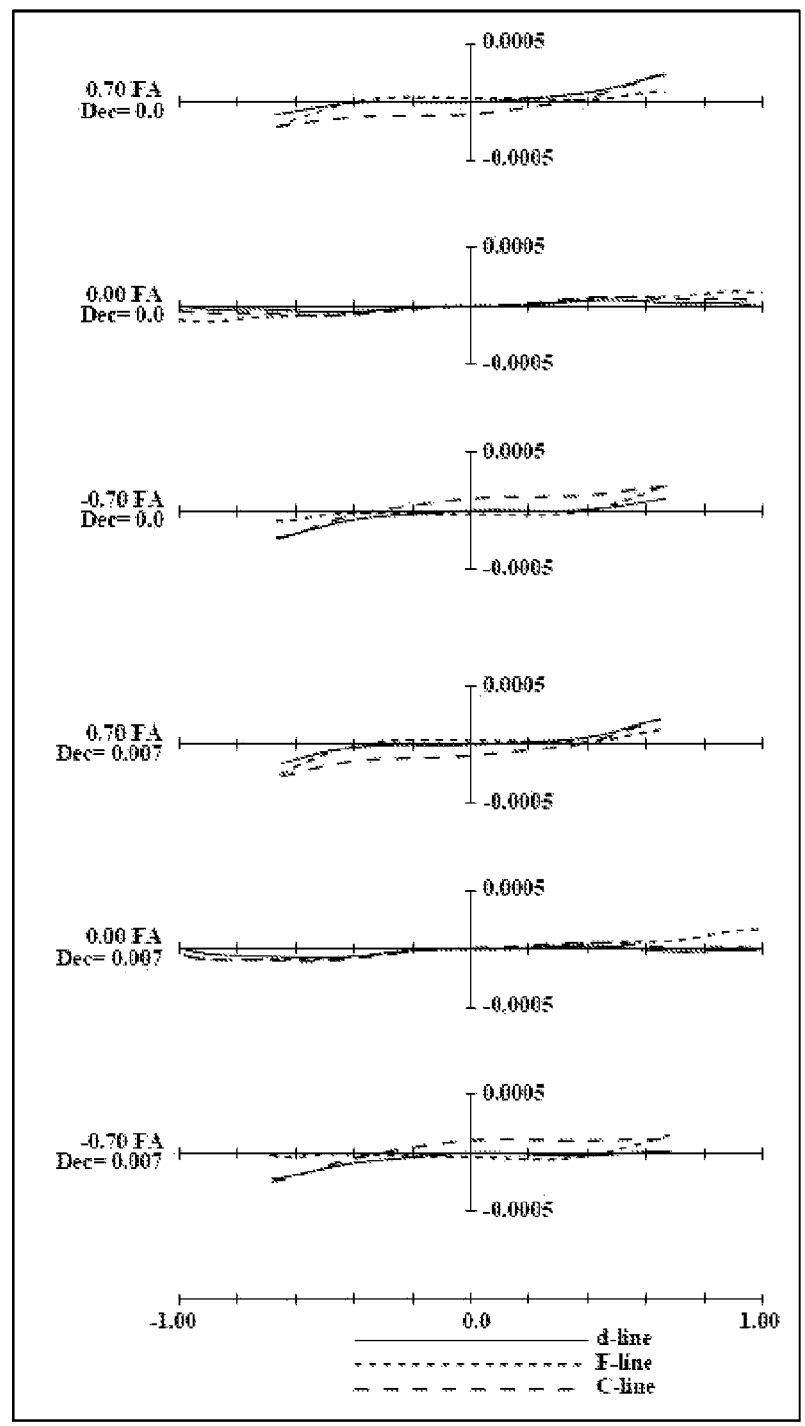
FIG. 6 is a lateral aberration diagram of the zoom lens system according to Numerical Example 2 at a telephoto limit in a basic state where image blur compensation is not performed and in an image blur compensation state.

As shown in FIG. 4, the zoom lens system according to Embodiment 2, in order from the object side to the image side, comprises a first lens unit G1 having positive optical power, a second lens unit G2 having negative optical power, a third lens unit G3 having positive optical power, a fourth lens unit G4 having negative optical power, a fifth lens unit G5 having negative optical power, a sixth lens unit G6 having positive optical power, a seventh lens unit G7 having negative optical power, and an eighth lens unit G8 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other.

The second lens unit G2, in order from the object side to the image side, comprises: a bi-concave fourth lens element L4; a bi-concave fifth lens element L5; a positive meniscus sixth lens element L6 with the convex surface facing the object side; an aperture diaphragm A; and a positive meniscus seventh lens element L7 with the convex surface facing the object side. Among these, the fifth lens element L5 and the sixth lens element L6 are cemented with each other.

The third lens unit G3, in order from the object side to the image side, comprises: a bi-convex eighth lens element L8; a negative meniscus ninth lens element L9 with the convex surface facing the image side; a bi-convex tenth lens element L10; a bi-convex eleventh lens element L11; and a negative meniscus twelfth lens element L12 with the convex surface facing the image side. Among these, the eighth lens element L8 and the ninth lens element L9 are cemented with each other, and the eleventh lens element L11 and the twelfth lens element L12 are cemented with each other. The eighth lens element L8 has an aspheric object side surface.

The fourth lens unit G4 comprises solely a negative meniscus thirteenth lens element L13 with the convex surface facing the object side.

The fifth lens unit G5, in order from the object side to the image side, comprises: a bi-convex fourteenth lens element L14; a bi-concave fifteenth lens element L15; a bi-concave sixteenth lens element L16; and a positive meniscus seventeenth lens element L17 with the convex surface facing the image side. Among these, the fourteenth lens element L14 and the fifteenth lens element L15 are cemented with each other.

The sixth lens unit G6 comprises solely a bi-convex eighteenth lens element L18.

The seventh lens unit G7 comprises solely a bi-concave nineteenth lens element L19.

The eighth lens unit G8 comprises solely a positive meniscus twentieth lens element L20 with the convex surface facing the object side.

In the zoom lens system according to Embodiment 2, in zooming from the wide-angle limit to the telephoto limit at the time of image taking, the first lens unit G1, the third lens unit G3, the fourth lens unit G4, the fifth lens unit G5, the sixth lens unit G6, the seventh lens unit G7, and the eighth lens unit G8 monotonically move to the object side, and the second lens unit G2 is fixed with respect to the image surface S.

In the zoom lens system according to Embodiment 2, in focusing from the infinity in-focus condition to the close-object in-focus condition, the fourth lens unit G4 moves to the image side along the optical axis, and the seventh lens unit G7 moves to the object side along the optical axis.

In the zoom lens system according to Embodiment 2, the fourth lens element L4, the fifth lens element L5, and the sixth lens element L6, which are parts of the second lens unit G2, correspond to an image blur compensating lens unit that moves in a direction perpendicular to the optical axis to optically compensate image blur.

Embodiment 3

Figure 7:
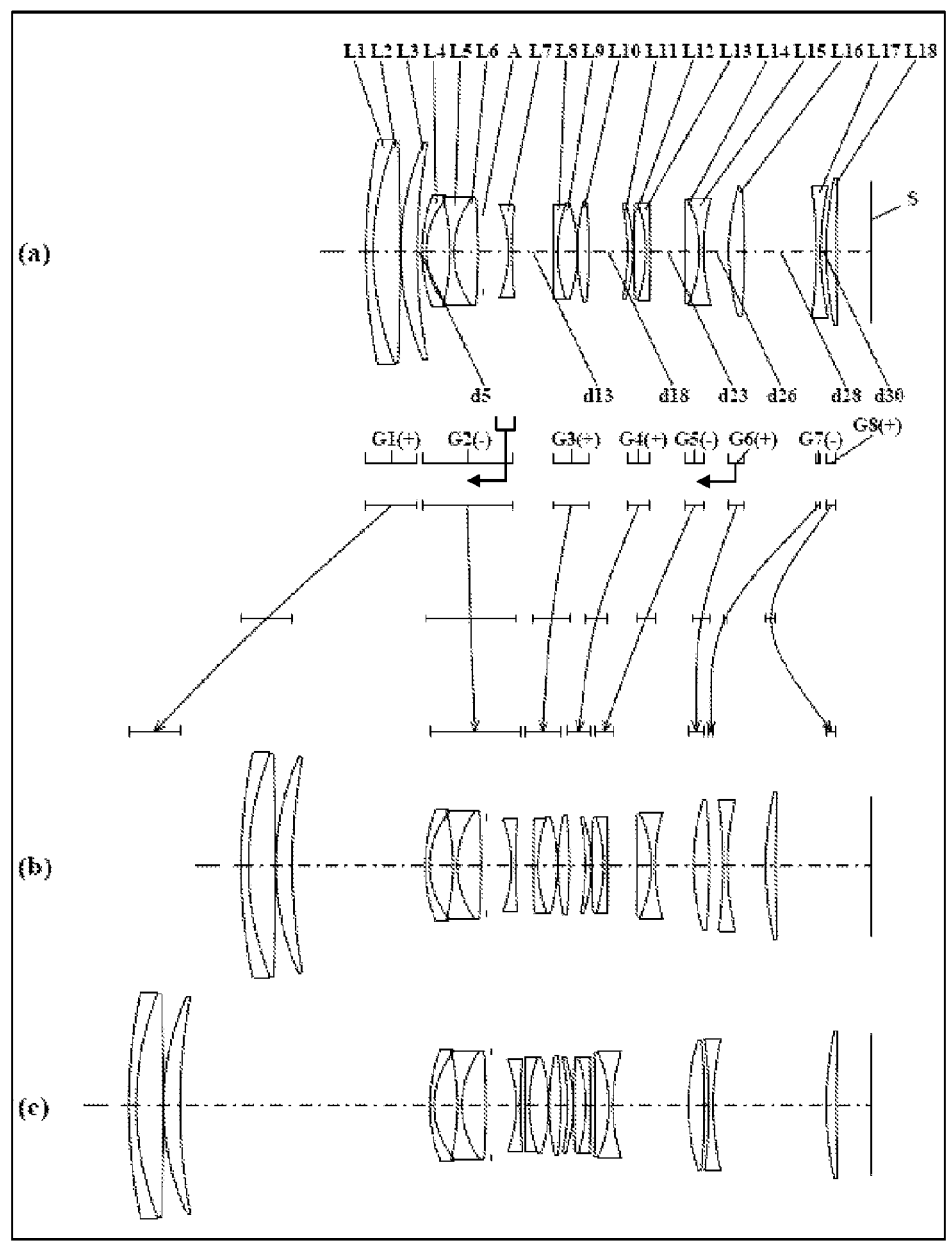
FIG. 7 is a lens arrangement diagram showing an infinity in-focus condition of a zoom lens system according to Embodiment 3 (Numerical Example 3)
Figure 8:
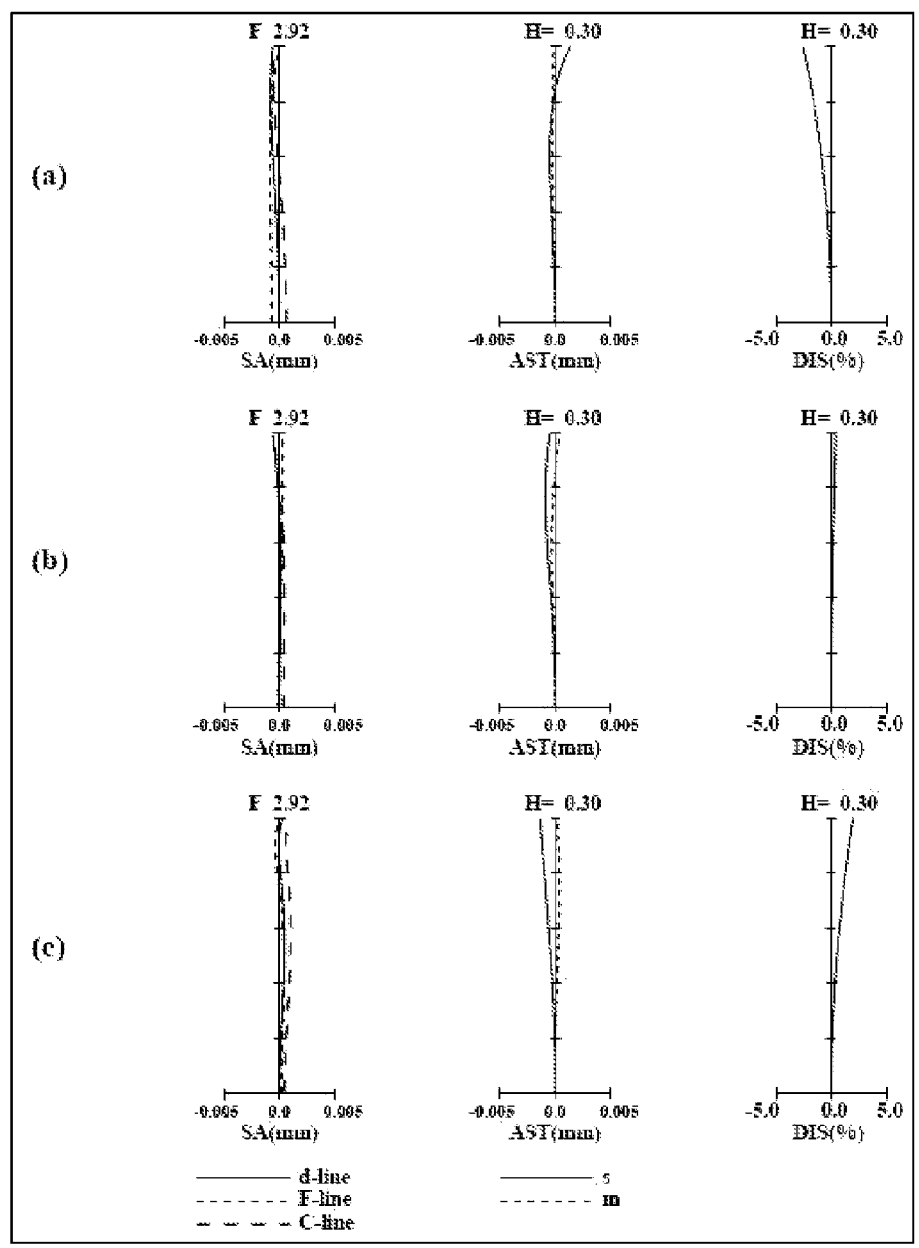
FIG. 8 is a longitudinal aberration diagram of an infinity in-focus condition of the zoom lens system according to Numerical Example 3.
Figure 9:
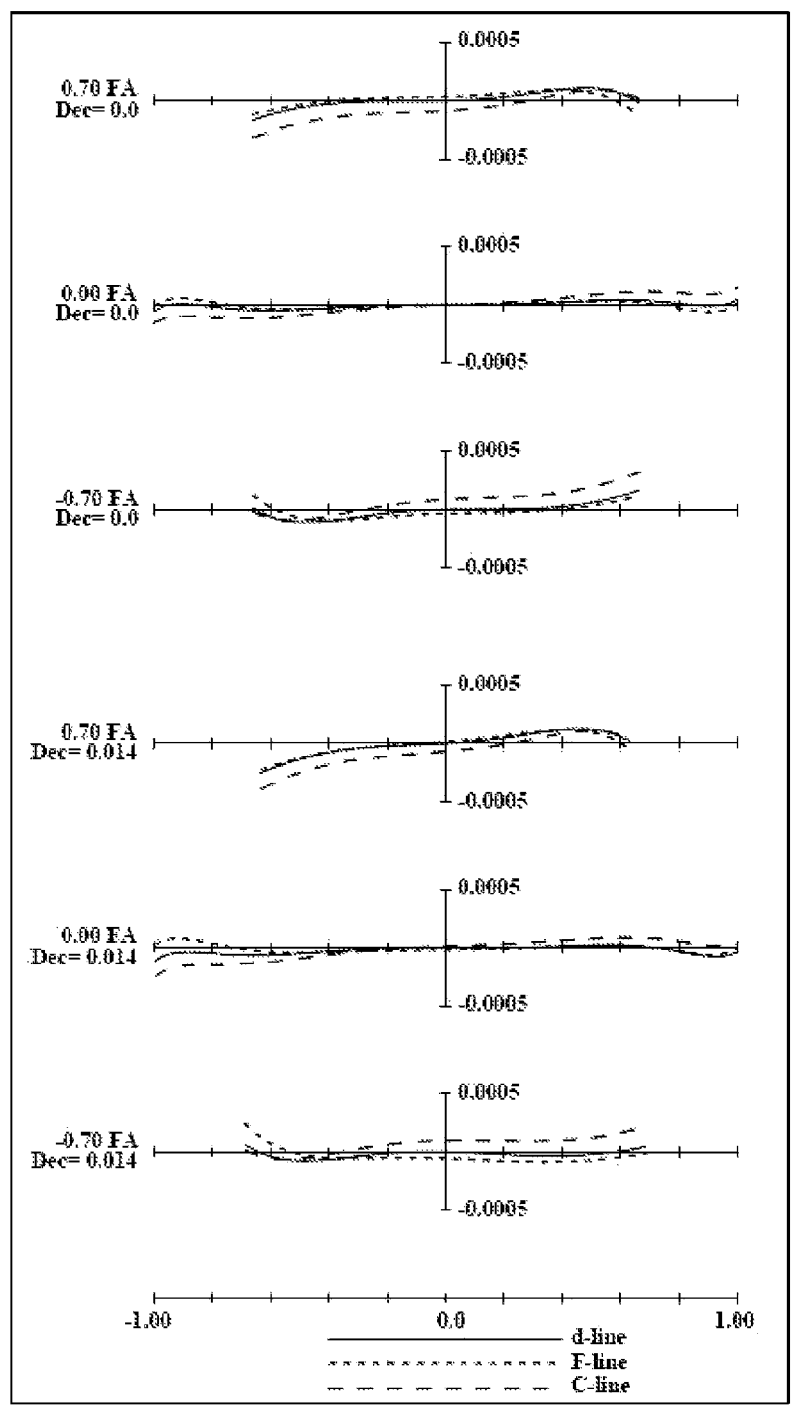
FIG. 9 is a lateral aberration diagram of the zoom lens system according to Numerical Example 3 at a telephoto limit in a basic state where image blur compensation is not performed and in an image blur compensation state.

As shown in FIG. 7, the zoom lens system according to Embodiment 3, in order from the object side to the image side, comprises a first lens unit G1 having positive optical power, a second lens unit G2 having negative optical power, a third lens unit G3 having positive optical power, a fourth lens unit G4 having positive optical power, a fifth lens unit G5 having negative optical power, a sixth lens unit G6 having positive optical power, a seventh lens unit G7 having negative optical power, and an eighth lens unit G8 having positive optical power.

The first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; a bi-convex sixth lens element L6; an aperture diaphragm A; and a bi-concave seventh lens element L7. Among these, the fifth lens element L5 and the sixth lens element L6 are cemented with each other.

The third lens unit G3, in order from the object side to the image side, comprises: a negative meniscus eighth lens element L8 with the convex surface facing the object side; a bi-convex ninth lens element L9; and a bi-convex tenth lens element L10. Among these, the eighth lens element L8 and the ninth lens element L9 are cemented with each other.

The fourth lens unit G4, in order from the object side to the image side, comprises: a positive meniscus eleventh lens element L11 with the convex surface facing the image side; a bi-convex twelfth lens element L12; and a negative meniscus thirteenth lens element L13 with the convex surface facing the image side. Among these, the twelfth lens element L12 and the thirteenth lens element L13 are cemented with each other.

The fifth lens unit G5, in order from the object side to the image side, comprises: a positive meniscus fourteenth lens element L14 with the convex surface facing the image side; and a bi-concave fifteenth lens element L15. The fourteenth lens element L14 and the fifteenth lens element L15 are cemented with each other.

The sixth lens unit G6 comprises solely a bi-convex sixteenth lens element L16.

The seventh lens unit G7 comprises solely a bi-concave seventeenth lens element L17.

The eighth lens unit G8 comprises solely a positive meniscus eighteenth lens element L18 with the convex surface facing the object side.

In the zoom lens system according to Embodiment 3, in zooming from the wide-angle limit to the telephoto limit at the time of image taking, the first lens unit G1, the third lens unit G3, the fourth lens unit G4, the fifth lens unit G5, the sixth lens unit G6, and the seventh lens unit G7 monotonically move to the object side, the second lens unit G2 monotonically moves to the image side, and the eighth lens unit G8 moves with locus of a convex to the object side.

In the zoom lens system according to Embodiment 3, in focusing from the infinity in-focus condition to the close-object in-focus condition, the seventh lens element L7, which is a part of the second lens unit G2, moves to the object side along the optical axis, and the sixth lens unit G6 moves to the object side along the optical axis.

In the zoom lens system according to Embodiment 3, the fifth lens unit G5 corresponds to an image blur compensating lens unit that moves in a direction perpendicular to the optical axis to optically compensate image blur.

Embodiment 4

Figure 10:
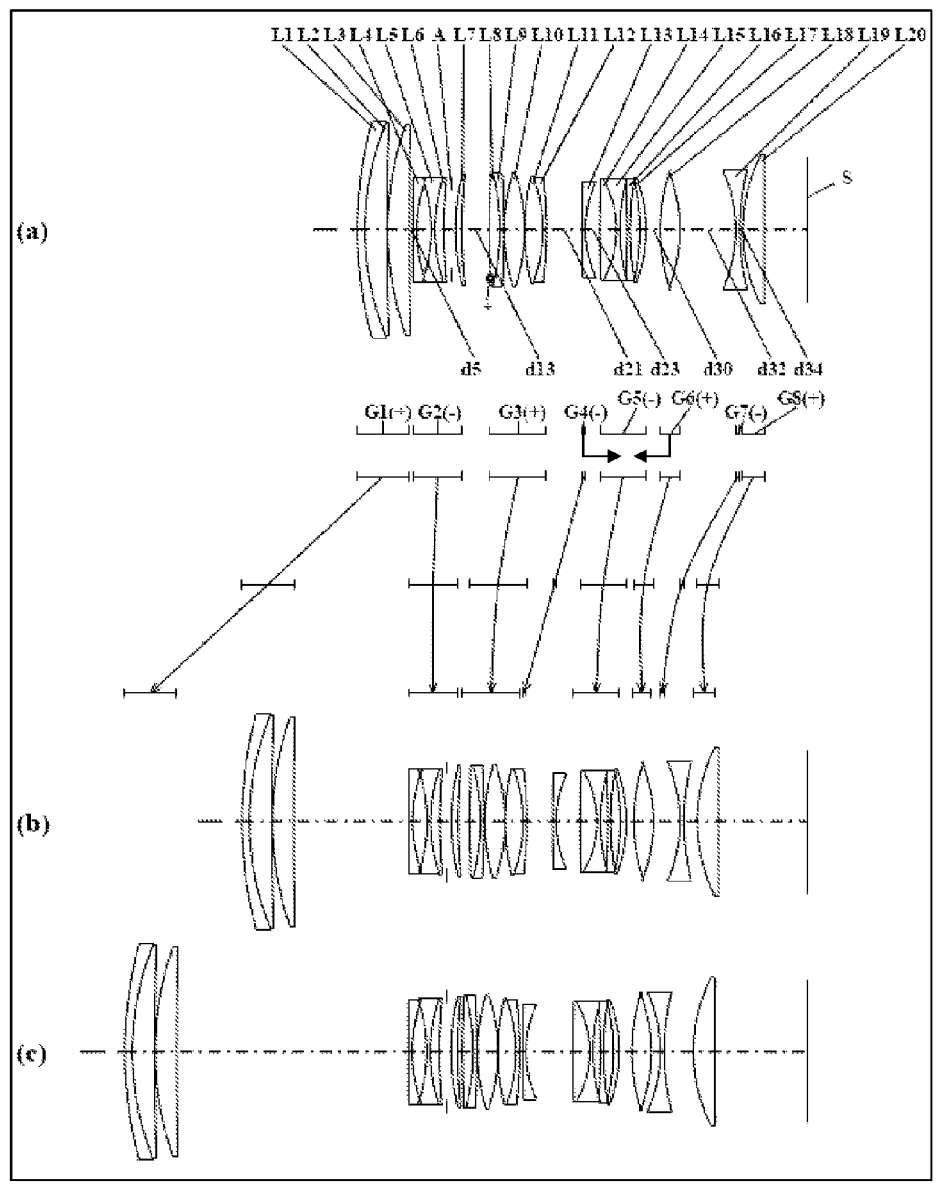
FIG. 10 is a lens arrangement diagram showing an infinity in-focus condition of a zoom lens system according to Embodiment 4 (Numerical Example 4)
Figure 11:
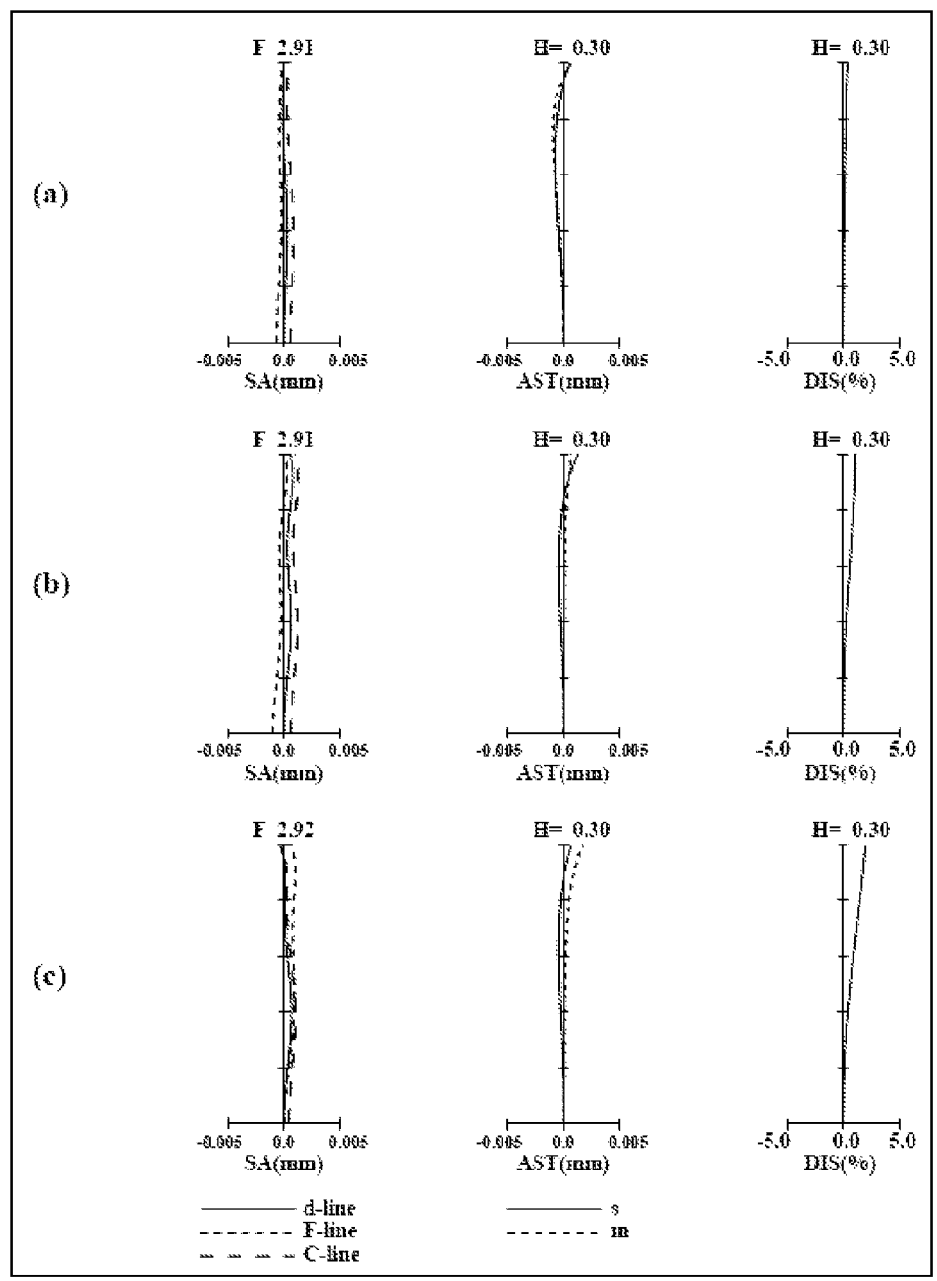
FIG. 11 is a longitudinal aberration diagram of an infinity in-focus condition of the zoom lens system according to Numerical Example 4.
Figure 12:
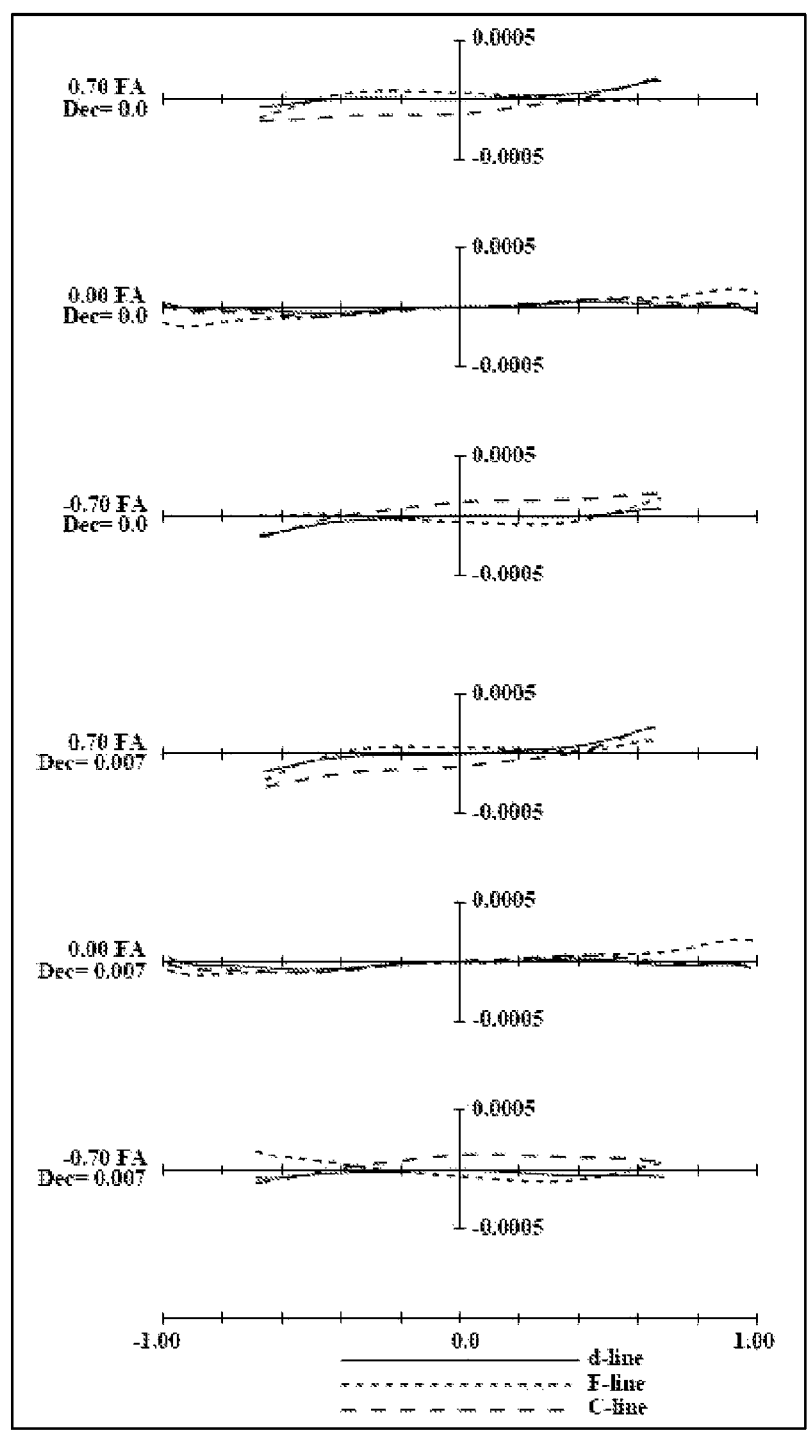
FIG. 12 is a lateral aberration diagram of the zoom lens system according to Numerical Example 4 at a telephoto limit in a basic state where image blur compensation is not performed and in an image blur compensation state.

As shown in FIG. 10, the zoom lens system according to Embodiment 4, in order from the object side to the image side, comprises a first lens unit G1 having positive optical power, a second lens unit G2 having negative optical power, a third lens unit G3 having positive optical power, a fourth lens unit G4 having negative optical power, a fifth lens unit G5 having negative optical power, a sixth lens unit G6 having positive optical power, a seventh lens unit G7 having negative optical power, and an eighth lens unit G8 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; a positive meniscus sixth lens element L6 with the convex surface facing the object side; an aperture diaphragm A; and a positive meniscus seventh lens element L7 with the convex surface facing the object side. Among these, the fifth lens element L5 and the sixth lens element L6 are cemented with each other.

The third lens unit G3, in order from the object side to the image side, comprises: a bi-convex eighth lens element L8; a negative meniscus ninth lens element L9 with the convex surface facing the image side; a bi-convex tenth lens element L10; a bi-convex eleventh lens element L11; and a negative meniscus twelfth lens element L12 with the convex surface facing the image side. Among these, the eighth lens element L8 and the ninth lens element L9 are cemented with each other, and the eleventh lens element L11 and the twelfth lens element L12 are cemented with each other. The eighth lens element L8 has an aspheric object side surface.

The fourth lens unit G4 comprises solely a negative meniscus thirteenth lens element L13 with the convex surface facing the object side.

The fifth lens unit G5, in order from the object side to the image side, comprises: a bi-convex fourteenth lens element L14; a bi-concave fifteenth lens element L15; a bi-concave sixteenth lens element L16; and a positive meniscus seventeenth lens element L17 with the convex surface facing the image side. Among these, the fourteenth lens element L14 and the fifteenth lens element L15 are cemented with each other.

The sixth lens unit G6 comprises solely a bi-convex eighteenth lens element L18.

The seventh lens unit G7 comprises solely a bi-concave nineteenth lens element L19.

The eighth lens unit G8 comprises solely a positive meniscus twentieth lens element L20 with the convex surface facing the object side.

In the zoom lens system according to Embodiment 4, in zooming from the wide-angle limit to the telephoto limit at the time of image taking, the first lens unit G1, the second lens unit G2, the fourth lens unit G4, the sixth lens unit G6, the seventh lens unit G7, and the eighth lens unit G8 monotonically move to the object side, and the third lens unit G3 and the fifth lens unit G5 move to the object side integrally and monotonically.

In the zoom lens system according to Embodiment 4, in focusing from the infinity in-focus condition to the close-object in-focus condition, the fourth lens unit G4 moves to the image side along the optical axis, and the sixth lens unit G6 moves to the object side along the optical axis.

In the zoom lens system according to Embodiment 4, the fourth lens element L4, the fifth lens element L5, and the sixth lens element L6, which are parts of the second lens unit G2, correspond to an image blur compensating lens unit that moves in a direction perpendicular to the optical axis to optically compensate image blur.

Embodiment 5

Figure 13:
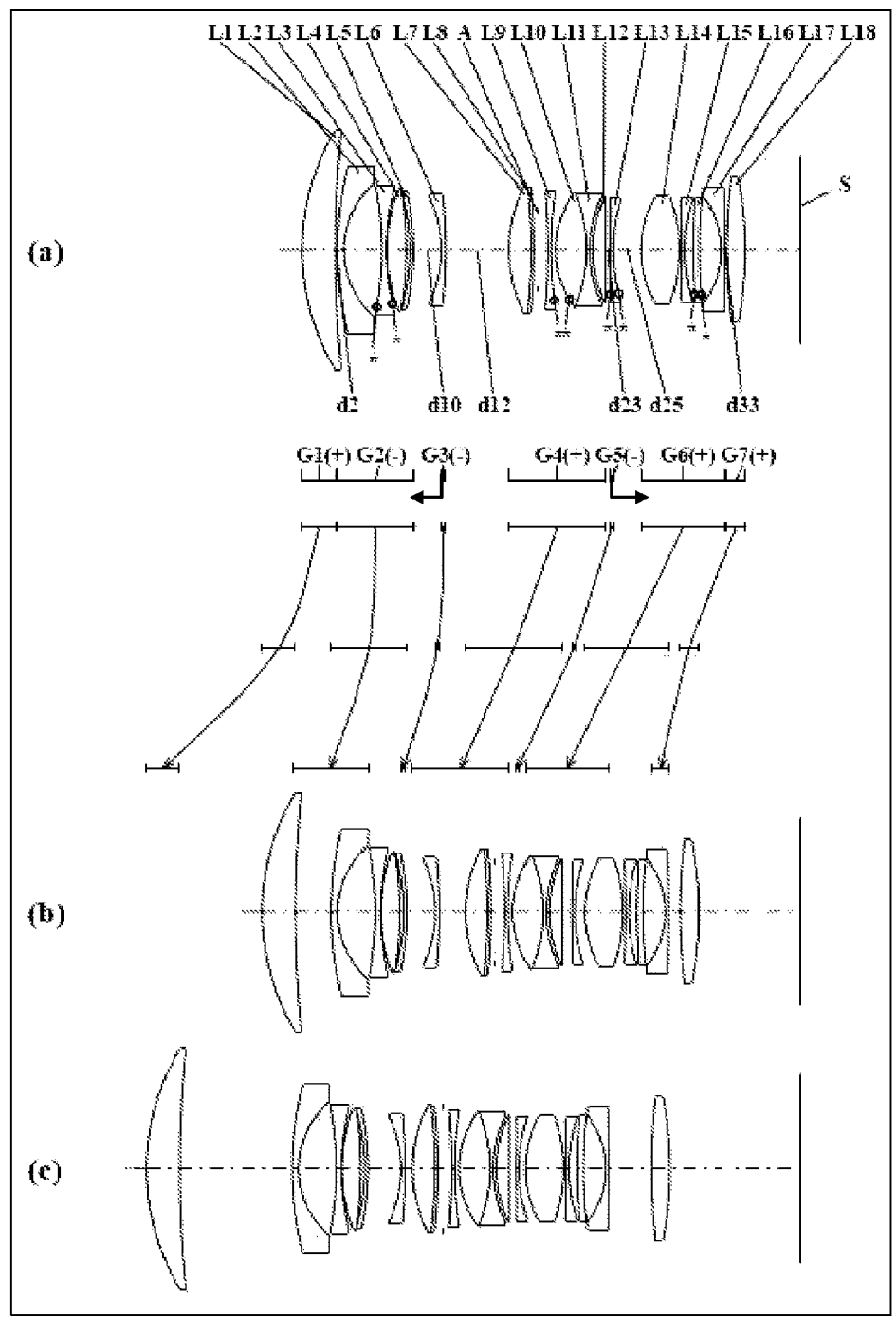
FIG. 13 is a lens arrangement diagram showing an infinity in-focus condition of a zoom lens system according to Embodiment 5 (Numerical Example 5)
Figure 14:
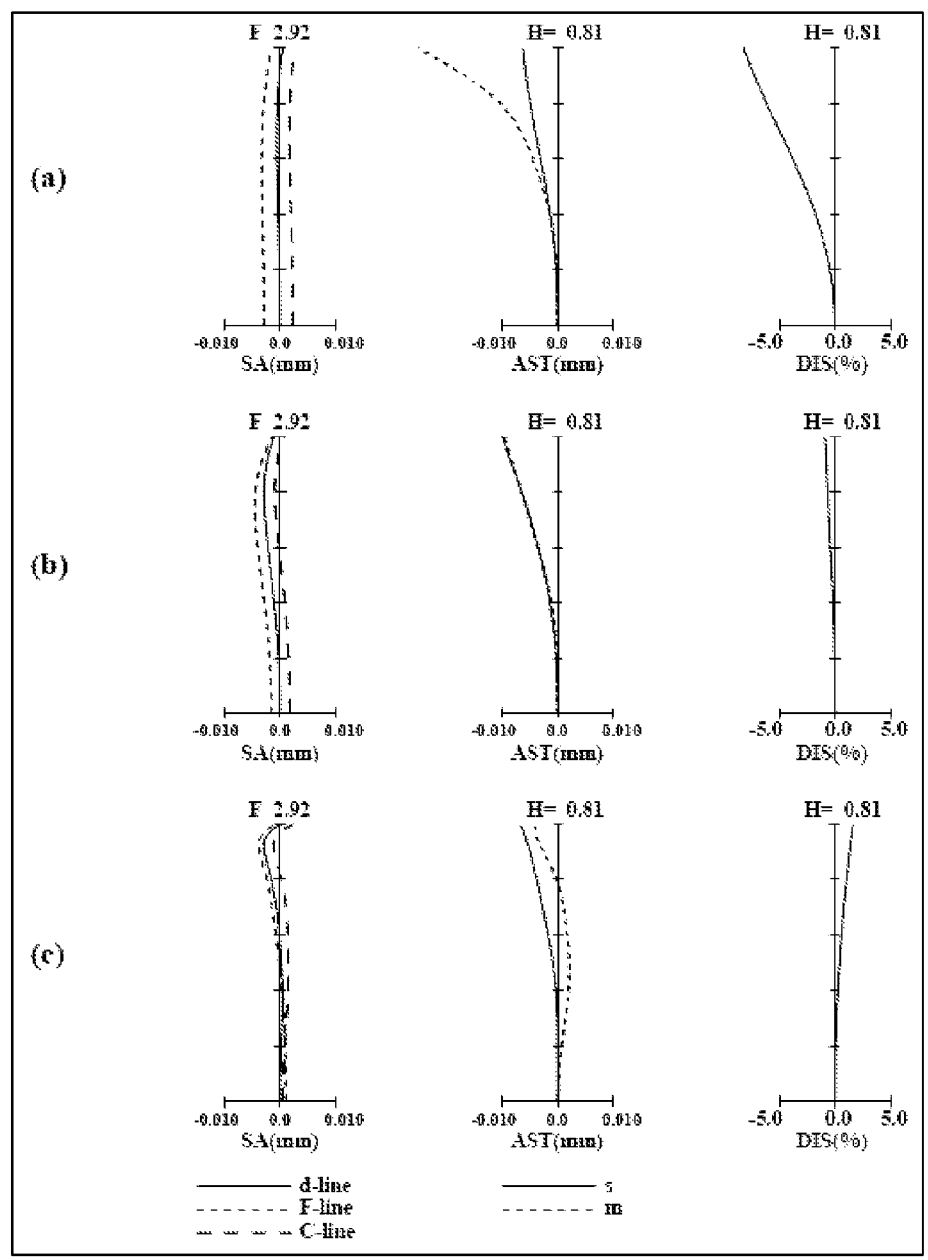
FIG. 14 is a longitudinal aberration diagram of an infinity in-focus condition of the zoom lens system according to Numerical Example 5.
Figure 15:
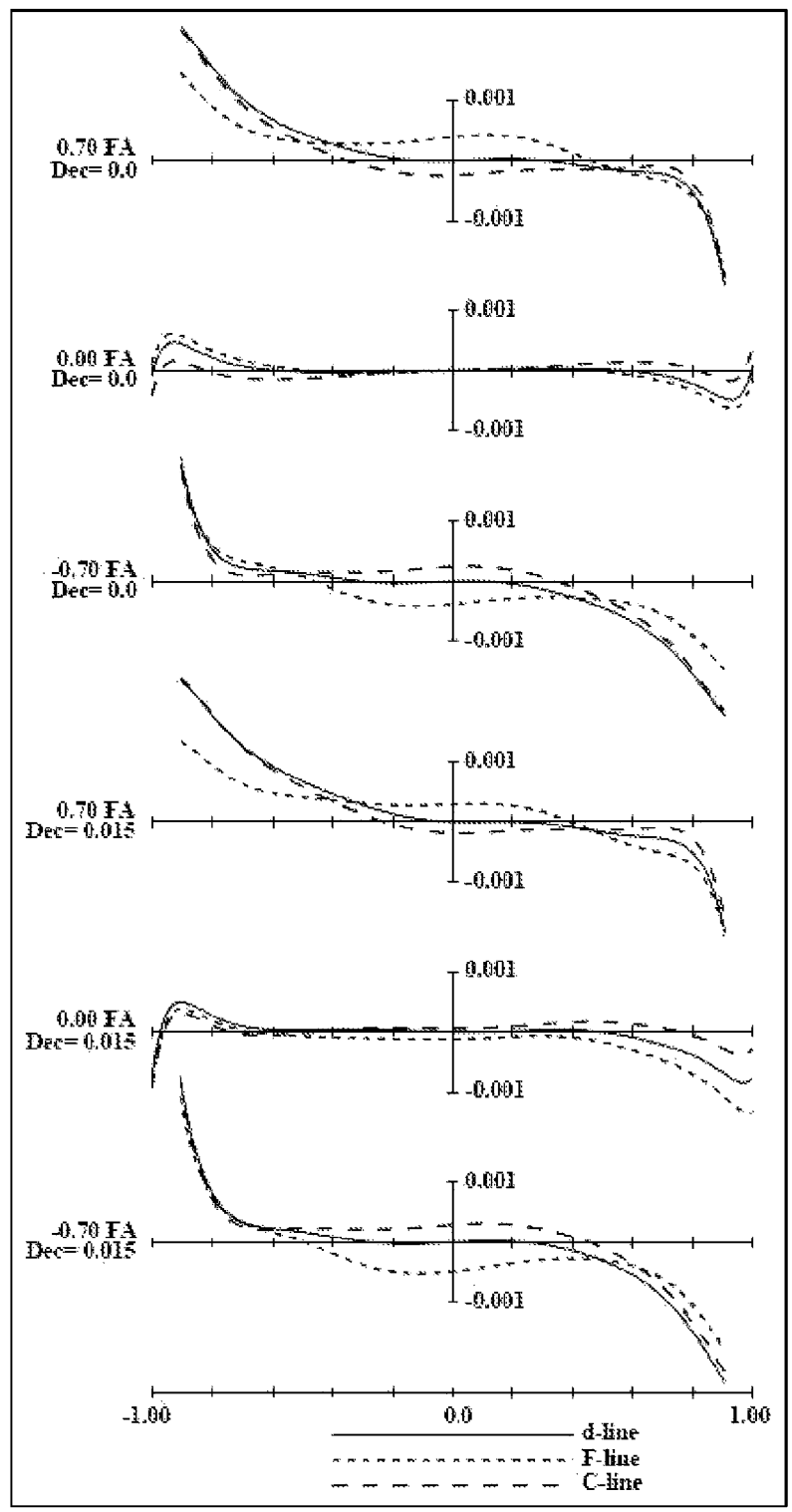
FIG. 15 is a lateral aberration diagram of the zoom lens system according to Numerical Example 5 at a telephoto limit in a basic state where image blur compensation is not performed and in an image blur compensation state.

As shown in FIG. 13, the zoom lens system according to Embodiment 5, in order from the object side to the image side, comprises a first lens unit G1 having positive optical power, a second lens unit G2 having negative optical power, a third lens unit G3 having negative optical power, a fourth lens unit G4 having positive optical power, a fifth lens unit G5 having negative optical power, a sixth lens unit G6 having positive optical power, and a seventh lens unit G7 having positive optical power.

The first lens unit G1 comprises solely a positive meniscus first lens element L1 with the convex surface facing the object side.

The second lens unit G2, in order from the object side to the image side, comprises: a negative meniscus second lens element L2 with the convex surface facing the object side; a bi-concave third lens element L3; a bi-convex fourth lens element L4; and a negative meniscus fifth lens element L5 with the convex surface facing the image side. The third lens element L3 has two aspheric surfaces.

The third lens unit G3 comprises solely a negative meniscus sixth lens element L6 with the convex surface facing the image side.

The fourth lens unit G4, in order from the object side to the image side, comprises: a bi-convex seventh lens element L7; a negative meniscus eighth lens element L8 with the convex surface facing the image side; an aperture diaphragm; a bi-concave ninth lens element L9; a bi-convex tenth lens element L10; a bi-concave eleventh lens element L11; and a bi-convex twelfth lens element L12. Among these, the seventh lens element L7 and the eighth lens element L8 are cemented with each other, and the tenth lens element L10 and the eleventh lens element L11 are cemented with each other. The ninth lens element L9 has two aspheric surfaces, and the twelfth lens element L12 has two aspheric surfaces.

The fifth lens unit G5 comprises solely a negative meniscus thirteenth lens element L13 with the convex surface facing the object side.

The sixth lens unit G6, in order from the object side to the image side, comprises: a bi-convex fourteenth lens element L14; a bi-concave fifteenth lens element L15; a positive meniscus sixteenth lens element L16 with the convex surface facing the object side; and a negative meniscus seventeenth lens element L17 with the convex surface facing the image side. The fifteenth lens element L15 has two aspheric surfaces.

The seventh lens unit G7 comprises solely a bi-convex eighteenth lens element L18.

In the zoom lens system according to Embodiment 5, in zooming from the wide-angle limit to the telephoto limit at the time of image taking, the first lens unit G1, the second lens unit G2, the third lens unit G3, the fourth lens unit G4, the fifth lens unit G5, the sixth lens unit G6, and the seventh lens unit G7 monotonically move to the object side.

In the zoom lens system according to Embodiment 5, in focusing from the infinity in-focus condition to the close-object in-focus condition, the third lens unit G3 moves to the object side along the optical axis, and the fifth lens unit G5 moves to the image side along the optical axis.

In the zoom lens system according to Embodiment 5, the ninth lens element L9, which is a part of the fourth lens unit G4, corresponds to an image blur compensating lens unit that moves in a direction perpendicular to the optical axis to optically compensate image blur.

Embodiment 6

Figure 16:
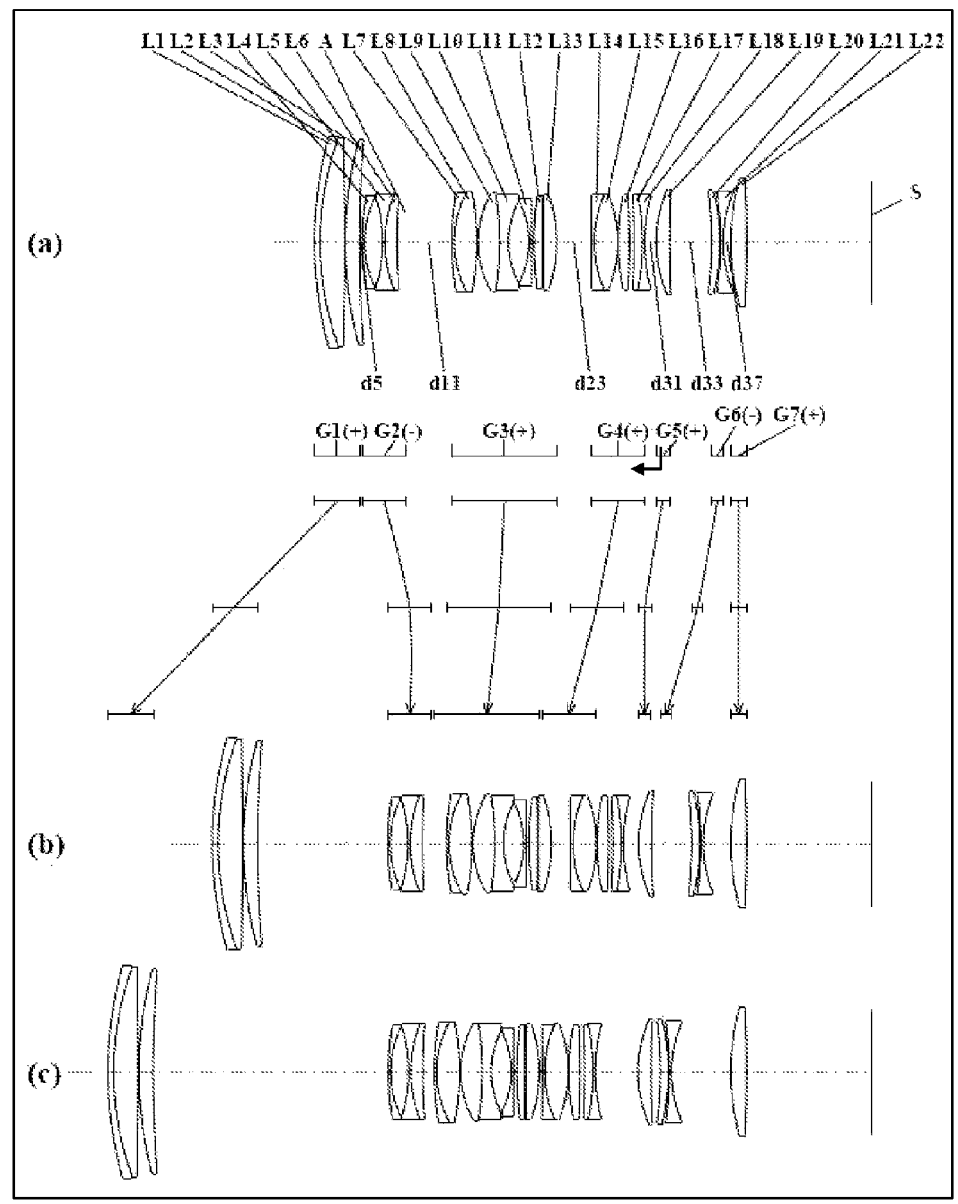
FIG. 16 is a lens arrangement diagram showing an infinity in-focus condition of a zoom lens system according to Embodiment 6 (Numerical Example 6)
Figure 17:
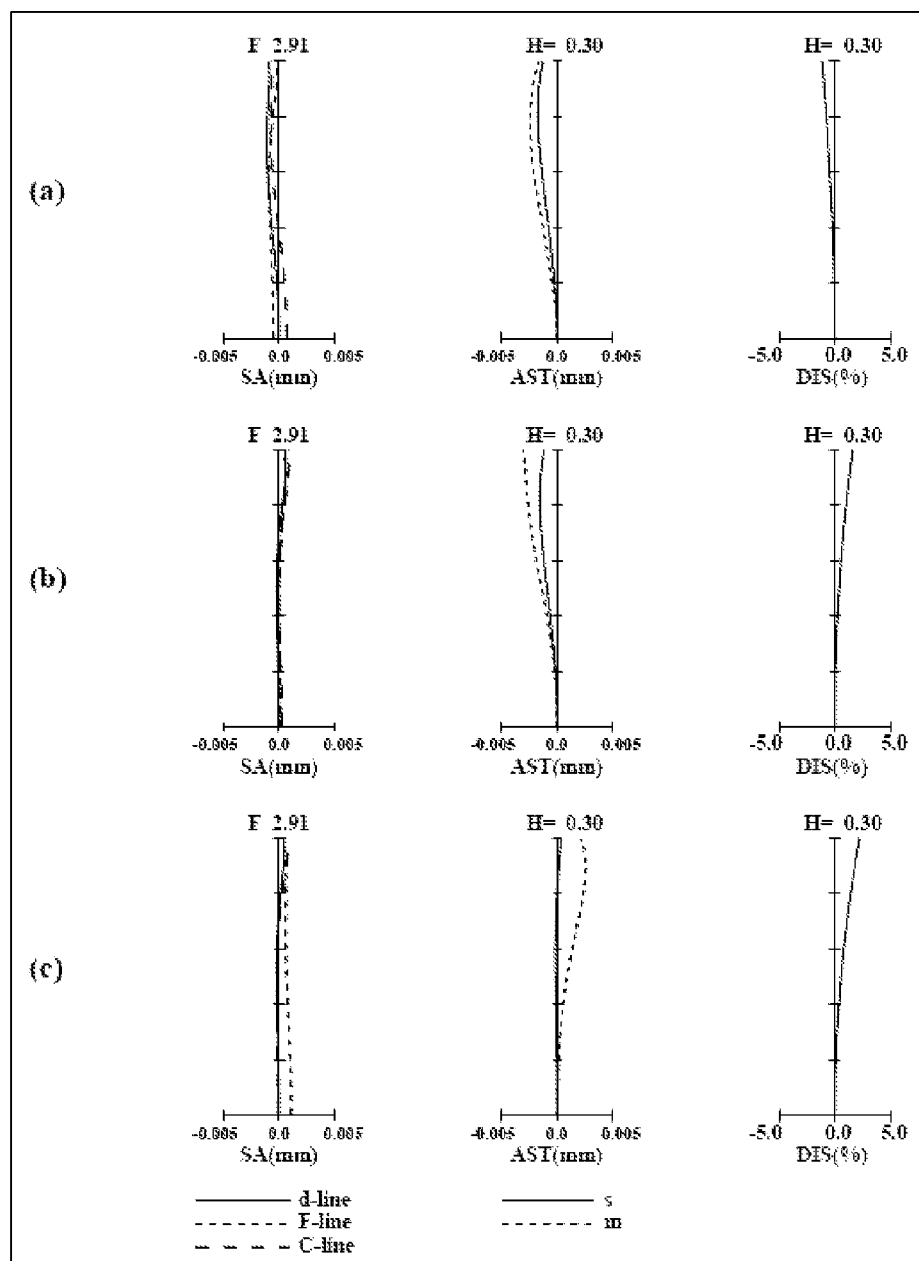
FIG. 17 is a longitudinal aberration diagram of an infinity in-focus condition of the zoom lens system according to Numerical Example 6.
Figure 18:
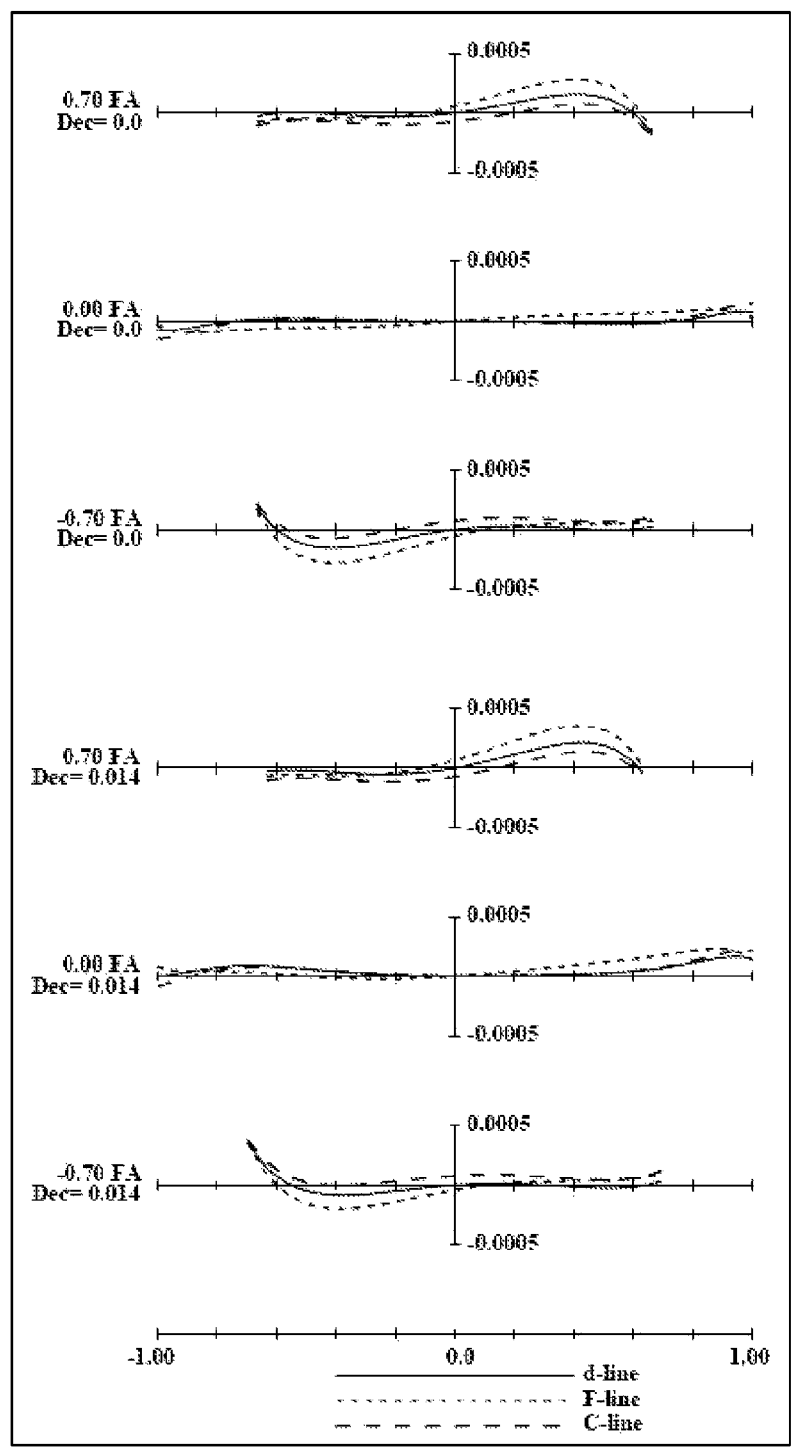
FIG. 18 is a lateral aberration diagram of the zoom lens system according to Numerical Example 6 at a telephoto limit in a basic state where image blur compensation is not performed and in an image blur compensation state.

As shown in FIG. 16, the zoom lens system according to Embodiment 6, in order from the object side to the image side, comprises a first lens unit G1 having positive optical power, a second lens unit G2 having negative optical power, a third lens unit G3 having positive optical power, a fourth lens unit G4 having positive optical power, a fifth lens unit G5 having positive optical power, a sixth lens unit G6 having negative optical power, and a seventh lens unit G7 having positive optical power.

The first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; a positive meniscus sixth lens element L6 with the convex surface facing the object side; and an aperture diaphragm A. Among these, the fifth lens element L5 and the sixth lens element L6 are cemented with each other.

The third lens unit G3, in order from the object side to the image side, comprises: a negative meniscus seventh lens element L7 with the convex surface facing the object side; a bi-convex eighth lens element L8; a bi-convex ninth lens element L9; a bi-concave tenth lens element L10; a bi-concave eleventh lens element L11; a bi-convex twelfth lens element L12; and a bi-convex thirteenth lens element L13. Among these, the seventh lens element L7 and the eighth lens element L8 are cemented with each other, and the ninth lens element L9 and the tenth lens element L10 are cemented with each other.

The fourth lens unit G4, in order from the object side to the image side, comprises: a bi-concave fourteenth lens element L14; a bi-convex fifteenth lens element L15; a bi-convex sixteenth lens element L16; a positive meniscus seventeenth lens element L17 with the convex surface facing the image side; and a bi-concave eighteenth lens element L18. Among these, the fourteenth lens element L14 and the fifteenth lens element L15 are cemented with each other, and the seventeenth lens element L17 and the eighteenth lens element L18 are cemented with each other.

The fifth lens unit G5 comprises solely a positive meniscus nineteenth lens element L19 with the convex surface facing the object side.

The sixth lens unit G6, in order from the object side to the image side, comprises: a positive meniscus twentieth lens element L20 with the convex surface facing the image side; and a bi-concave twenty-first lens element L21.

The seventh lens unit G7 comprises solely a bi-convex twenty-second lens element L22.

In the zoom lens system according to Embodiment 6, in zooming from the wide-angle limit to the telephoto limit at the time of image taking, the first lens unit G1, the third lens unit G3, the fourth lens unit G4, the fifth lens unit G5, and the sixth lens unit G6 monotonically move to the object side, the second lens unit G2 monotonically moves to the image side, and the seventh lens unit G7 is fixed with respect to the image surface S.

In the zoom lens system according to Embodiment 6, in focusing from the infinity in-focus condition to the close-object in-focus condition, the fifth lens unit G5 moves to the object side along the optical axis.

In the zoom lens system according to Embodiment 6, the seventeenth lens element L17 and the eighteenth lens element L18, which are parts of the fourth lens unit G4, correspond to an image blur compensating lens unit that moves in a direction perpendicular to the optical axis to optically compensate image blur.

The following description is given for conditions that a zoom lens system like the zoom lens systems according to Embodiments 1 to 6 can satisfy. Here, a plurality of beneficial conditions is set forth for the zoom lens system according to each embodiment. A construction that satisfies all the plurality of conditions is most effective for the zoom lens system. However, when an individual condition is satisfied, a zoom lens system having the corresponding effect is obtained.

For example, in a zoom lens system like the zoom lens systems according to Embodiments 1 to 6, which comprises lens units each being composed of at least one lens element, and includes, in order from the object side to the image side, a first lens unit located closest to the object side and having positive optical power, a second lens unit having negative optical power, and subsequent five or six lens units, in which an aperture diaphragm is provided, the intervals between the adjacent lens units vary in zooming from the wide-angle limit to the telephoto limit at the time of image taking, and the first lens unit moves along the optical axis in the zooming and is fixed with respect to the image surface in focusing from the infinity in-focus condition to the close-object in-focus condition (this lens configuration is referred to as a basic configuration of the embodiments, hereinafter), the following conditions (1), (2), and (3) are satisfied:

$$BF/f_W < 0.66 \quad (1)$$

$$D_A/L_W > 0.42 \quad (2)$$

$$D_{AIR}/Y < 2.00 \quad (3)$$

where
BF is a distance from an apex of an image side surface of the lens element located closest to the image side, to the image surface,
$f_W$ is a focal length of the zoom lens system at the wide-angle limit,
$D_A$ is a sum of optical axial thicknesses of the lens units in the zoom lens system,
$L_W$ is an overall length of the lens system at the wide-angle limit, which is an optical axial distance from an object side surface of the lens element located closest to the object side to the image surface at the wide-angle limit,
$D_{AIR}$ is a maximum value of air spaces between the lens elements constituting the lens system at the wide-angle limit,
Y is a maximum image height expressed by the following formula:

$$Y = f_T \times \tan(\omega_T),$$

$f_T$ is a focal length of the zoom lens system at the telephoto limit, and
$\omega_T$ is a half value (°) of a maximum view angle at the telephoto limit.

The condition (1) sets forth the ratio between the back focal length and the focal length of the zoom lens system at the wide-angle limit. When the value exceeds the upper limit of the condition (1), the back focal length is lengthened, which makes size reduction of the lens system difficult.

When the following condition (1)' is satisfied, the above-mentioned effect is achieved more successfully.

$$BF/f_W < 0.45 \quad (1)'$$

When the following condition (1)" is further satisfied, the above-mentioned effect is achieved more successfully.

$$BF/f_W < 0.30 \quad (1)''$$

The condition (2) sets forth the ratio between the sum of the optical axial thicknesses of the lens units and the overall length of the lens system at the wide-angle limit. When the value goes below the lower limit of the condition (2), the overall length of the lens system is increased, which makes size reduction of a lens barrel difficult.

When the following condition (2)' is satisfied, the above-mentioned effect is achieved more successfully.

$$D_A/L_W > 0.45 \quad (2)'$$

When the following condition (2)" is further satisfied, the above-mentioned effect is achieved more successfully.

$$D_A/L_W > 0.50 \quad (2)''$$

The condition (3) sets forth the maximum air space between the lens elements constituting the lens system at the wide-angle limit. When the value exceeds the upper limit of the condition (3), the overall length of the lens system is increased, which makes size reduction of the lens barrel difficult.

When the following condition (3)' is satisfied, the above-mentioned effect is achieved more successfully.

$$D_{AIR}/Y < 1.60 \quad (3)'$$

When the following condition (3)" is further satisfied, the above-mentioned effect is achieved more successfully.

$$D_{AIR}/Y < 1.20 \quad (3)''$$

A zoom lens system having the basic configuration, like the zoom lens systems according to Embodiments 1 to 6, beneficially satisfies the following condition (4):

$$1.0 < f_1/f_W < 6.0 \quad (4)$$

where
$f_1$ is a focal length of the first lens unit, and
$f_W$ is a focal length of the zoom lens system at the wide-angle limit.

The condition (4) sets forth the ratio between the focal length of the first lens unit and the focal length of the zoom lens system at the wide-angle limit. When the value goes below the lower limit of the condition (4), the optical power of the first lens unit becomes strong, which makes it difficult to compensate axial chromatic aberration that occurs at the telephoto limit. When the value exceeds the upper limit of the condition (4), the amount of draw-out of the first lens unit in zooming from the wide-angle limit to the telephoto limit is increased, resulting in increase in the size of the optical system.

When at least one of the following conditions (4-1)' and (4-1)" is satisfied, the above-mentioned effect is achieved more successfully.

$$1.5 < f_1/f_W \quad (4-1)'$$

$$f_1/f_W < 4.5 \quad (4-1)''$$

When at least one of the following conditions (4-2)' and (4-2)" is further satisfied, the above-mentioned effect is achieved more successfully.

$$1.9 < f_1/f_W \quad (4-2)'$$

$$f_1/f_W < 3.0 \quad (4-2)''$$

A zoom lens system having the basic configuration, like the zoom lens systems according to Embodiments 1 to 6, beneficially satisfies the following condition (5):

$$-0.60 < f_2/f_1 < -0.20 \quad (5)$$

where
$f_1$ is the focal length of the first lens unit, and
$f_2$ is a focal length of the second lens unit.

The condition (5) sets forth the ratio between the focal length of the first lens unit and the focal length of the second lens unit. When the value goes below the lower limit of the condition (5), the optical power of the first lens unit becomes strong, which makes it difficult to compensate axial chromatic aberration that occurs at the telephoto limit. When the value exceeds the upper limit of the condition (5), the optical power of the second lens unit becomes strong, which makes it difficult to compensate curvature of field.

When at least one of the following conditions (5-1)' and (5-1)" is satisfied, the above-mentioned effect is achieved more successfully.

$$-0.50 < f_2/f_1 \quad (5-1)'$$

$$f_2/f_1 < -0.25 \quad (5-1)''$$

When at least one of the following conditions (5-2)' and (5-2)" is further satisfied, the above-mentioned effect is achieved more successfully.

$$-0.45 < f_2/f_1 \quad (5\text{-}2)'$$

$$f_2/f_1 < -0.30 \quad (5\text{-}2)''$$

A zoom lens system having the basic configuration, like the zoom lens systems according to Embodiments 1 to 6, beneficially satisfies the following condition (6):

$$0.40 < |f_3/f_2| < 1.55 \quad (6)$$

where $f_2$ is the focal length of the second lens unit, and $f_3$ is a focal length of a lens unit located closest to the object side, among the subsequent lens units.

The condition (6) sets forth the ratio between the focal length of the lens unit located closest to the object side among the subsequent lens units, that is the third lens unit, and the focal length of the second lens unit. When the value goes below the lower limit of the condition (6), the optical power of the third lens unit becomes strong, which makes it difficult to compensate spherical aberration. When the value exceeds the upper limit of the condition (6), the optical power of the second lens unit becomes strong, which makes it difficult to compensate curvature of field.

When at least one of the following conditions (6)' and (6)" is satisfied, the above-mentioned effect is achieved more successfully.

$$0.50 < |f_3/f_2| \quad (6)'$$

$$|f_3/f_2| < 1.50 \quad (6)''$$

A zoom lens system having the basic configuration, like the zoom lens systems according to Embodiments 1 to 6, beneficially satisfies the following condition (7):

$$1.1 < L_T/L_W < 1.8 \quad (7)$$

where $L_W$ is the overall length of the lens system at the wide-angle limit, which is the optical axial distance from the object side surface of the lens element located closest to the object side to the image surface at the wide-angle limit, and $L_T$ is an overall length of the lens system at the telephoto limit, which is an optical axial distance from the object side surface of the lens element located closest to the object side to the image surface at the telephoto limit.

The condition (7) sets forth the amount of movement of the first lens unit in zooming from the wide-angle limit to the telephoto limit. When the value goes below the lower limit of the condition (7), the overall length of the lens system at the wide-angle limit is increased, resulting in increase in the size of the lens system. When the value exceeds the upper limit of the condition (7), the amount of movement of the first lens unit increases, which makes size reduction of the lens barrel difficult.

When at least one of the following conditions (7)' and (7)" is satisfied, the above-mentioned effect is achieved more successfully.

$$1.2 < L_T/L_W \quad (7)'$$

$$L_T/L_W < 1.6 \quad (7)''$$

In a zoom lens system having the basic configuration, like the zoom lens systems according to Embodiments 1 to 6, a lens element located closest to the image side in the first lens unit beneficially satisfies the following condition (8):

$$65.0 < vd_1 \quad (8)$$

where $vd_1$ is an Abbe number to a d-line of the lens element located closest to the image side in the first lens unit.

The condition (8) sets forth the Abbe number to the d-line of the lens element located closest to the image side in the first lens unit. When the value goes below the lower limit of the condition (8), compensation of axial chromatic aberration that occurs at the telephoto limit becomes difficult.

When the following condition (8)' is satisfied, the above-mentioned effect is achieved more successfully.

$$66.0 < vd_1 \quad (8)'$$

In the zoom lens system according to the present disclosure, it is beneficial that the aperture diaphragm is located in the second lens unit or in the subsequent lens units, and that at least one lens unit among the lens units located on the image side relative to the aperture diaphragm is a focusing lens unit that moves along the optical axis in focusing from the infinity in-focus condition to the close-object in-focus condition. Thereby, diameter reduction and weight reduction of the focusing lens unit are achieved, resulting in size reduction of the lens barrel.

In the zoom lens system according to the present disclosure, it is beneficial that the aperture diaphragm is located in the second lens unit or in the subsequent lens units, and that at least one lens unit among the lens units located on the image side relative to the aperture diaphragm moves along the optical axis in zooming from the wide-angle limit to the telephoto limit at the time of image taking. Thereby, the optical power of each lens unit located on the object side relative to the aperture diaphragm is reduced, and thus axial chromatic aberration at the telephoto limit can be successfully compensated.

In the zoom lens system according to the present disclosure, it is beneficial that the lens unit located closest to the image side among the subsequent lens units moves along the optical axis in zooming from the wide-angle limit to the telephoto limit at the time of image taking. Thus, the diameter of the lens unit located closest to the image side among the subsequent lens units can be reduced.

In the zoom lens system according to the present disclosure, it is beneficial that two selected from a part of the second lens unit and the subsequent lens units are focusing lens units that move along the optical axis in focusing from the infinity in-focus condition to the close-object in-focus condition. Thus, aberration fluctuation in focusing can be reduced.

In the zoom lens system according to the present disclosure, it is beneficial that the focusing lens unit that moves along the optical axis in focusing from the infinity in-focus condition to the close-object in-focus condition is composed of one lens element. Thus, reduction in the weight of the focusing lens unit can be achieved.

In the zoom lens system according to the present disclosure, it is beneficial that the first lens unit is composed of three or less lens elements. Thus, the optical axial thickness of the first lens unit is not increased, resulting in size reduction of the optical system.

In the zoom lens system according to the present disclosure, it is beneficial that the focusing lens unit that moves along the optical axis in focusing from the infinity in-focus condition to the close-object in-focus condition is composed of at least one lens element having negative optical power. Thus, the convergent function of each lens element located on the object side relative to the focusing lens unit can be enhanced, resulting in reduction in the diameter of the focusing lens unit.

In the zoom lens system according to the present disclosure, it is beneficial that the image blur compensating lens unit that moves in the direction perpendicular to the optical axis in order to optically compensate image blur is included in the second lens unit or in the subsequent lens units, and has negative optical power. Thus, the convergent function of each lens element located on the object side relative to the image blur compensating lens unit can be enhanced, resulting in reduction in the diameter of the image blur compensating lens unit.

In the zoom lens system according to the present disclosure, it is beneficial that the aperture diaphragm is located in the second lens unit, and moves along the optical axis together with the second lens unit in zooming from the wide-angle limit to the telephoto limit at the time of image taking. Thus, reduction in the diameter of the second lens unit can be achieved.

The individual lens units constituting the zoom lens systems according to Embodiments 1 to 6 are each composed exclusively of refractive type lens elements that deflect incident light by refraction (that is, lens elements of a type in which deflection is achieved at the interface between media having different refractive indices). However, the present disclosure is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved. Thus, such a configuration is beneficial.

As described above, Embodiments 1 to 6 have been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Embodiment 7

Figure 19:
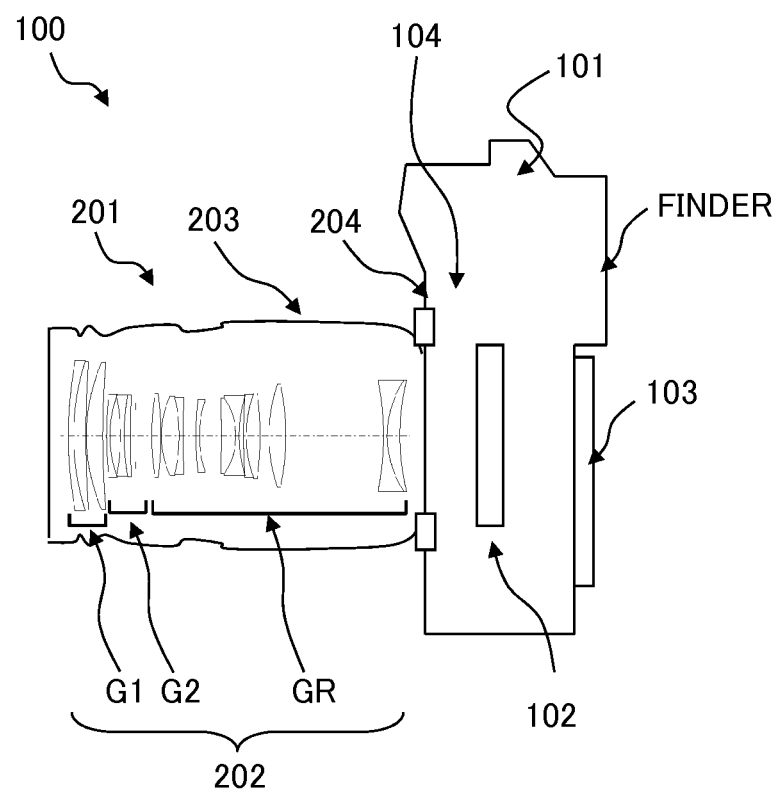
FIG. 19 is a schematic construction diagram of an interchangeable-lens type digital camera system according to Embodiment 7.

FIG. 19 is a schematic construction diagram of an interchangeable-lens type digital camera system according to Embodiment 7.

The interchangeable-lens type digital camera system 100 according to Embodiment 7 includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a zoom lens system 202 according to any of Embodiments 1 to 6; a lens barrel 203 which holds the zoom lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 19, the zoom lens system according to Embodiment 1 is employed as the zoom lens system 202.

In Embodiment 7, since the zoom lens system 202 according to any of Embodiments 1 to 6 is employed, a compact interchangeable lens apparatus having excellent imaging performance can be realized at low cost. Moreover, size reduction and cost reduction of the entire camera system 100 according to Embodiment 7 can be achieved. In the zoom lens systems according to Embodiments 1 to 6, the entire zooming range need not be used. That is, in accordance with a desired zooming range, a range where satisfactory optical performance is obtained may exclusively be used. Then, the zoom lens system may be used as one having a lower magnification than the zoom lens systems described in Embodiments 1 to 6.

As described above, Embodiment 7 has been described as an example of art disclosed in the present application. However, the art in the present disclosure is not limited to this embodiment. It is understood that various modifications, replacements, additions, omissions, and the like have been performed in this embodiment to give optional embodiments, and the art in the present disclosure can be applied to the optional embodiments.

Numerical examples are described below in which the zoom lens systems according to Embodiments 1 to 6 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1+\sqrt{1-(1+\kappa)(h/r)^2}} + \sum A_n h^n$$

Here, the symbols in the formula indicate the following quantities.

Z is a distance from a point on an aspherical surface at a height h relative to the optical axis to a tangential plane at the vertex of the aspherical surface, h is a height relative to the optical axis, r is a radius of curvature at the top, κ is a conic constant, and $A_n$ is a n-th order aspherical coefficient.

FIGS. 2, 5, 8, 11, 14, and 17 are longitudinal aberration diagrams of an infinity in-focus condition of the zoom lens systems according to Numerical Examples 1 to 6, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 3, 6, 9, 12, 15, and 18 are lateral aberration diagrams of the zoom lens systems at a telephoto limit according to Numerical Examples 1 to 6, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line, and the long dash line indicate the characteristics to the d-line, the F-line, and the C-line, respectively. In each lateral aberration diagram, the meridional plane is adopted as the plane containing the optical axis of the first lens unit G1, the optical axis of the second lens unit G2, and the optical axis of the subsequent lens unit GR.

Here, in the zoom lens system according to each example, the amount of movement of the image blur compensating lens unit in a direction perpendicular to the optical axis in an image blur compensation state at a telephoto limit is as follows.

| Numerical Example | Amount of movement (mm) |
|---|---|
| 1 | 0.008 |
| 2 | 0.007 |
| 3 | 0.014 |
| 4 | 0.007 |
| 5 | 0.015 |
| 6 | 0.014 |

When the shooting distance is infinity, at a telephoto limit, the amount of image decentering in a case that the zoom lens system inclines by a predetermined angle is equal to the amount of image decentering in a case that the image blur compensating lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to a predetermined angle without degrading the imaging characteristics.

Numerical Example 1

The zoom lens system of Numerical Example 1 corresponds to Embodiment 1 shown in FIG. 1. Table 1 shows the surface data of the zoom lens system of Numerical Example 1. Table 2 shows the various data. Table 3 shows the zoom lens unit data.

TABLE 1

(Surface data)

| Surface number | r | d | nd | vd |
|---|---|---|---|---|
| Object surface | ∞ | | | |
| 1 | 1.84040 | 0.02510 | 1.85026 | 32.3 |
| 2 | 1.15550 | 0.05530 | 1.49700 | 81.6 |
| 3 | 4.93880 | 0.00140 | | |
| 4 | 0.83690 | 0.07290 | 1.49700 | 81.6 |
| 5 | 4.07350 | Variable | | |
| 6 | 1.60820 | 0.01670 | 1.62041 | 60.3 |
| 7 | 0.55490 | 0.04650 | | |
| 8 | −0.85340 | 0.01670 | 1.62041 | 60.3 |
| 9 | 1.07880 | 0.02760 | 1.92286 | 20.9 |
| 10 | 5.77490 | 0.02380 | | |
| 11 (Diaphragm) | ∞ | Variable | | |
| 12 | 1.17250 | 0.04180 | 1.80420 | 46.5 |
| 13 | −1.51630 | 0.00140 | | |
| 14 | 0.41340 | 0.08130 | 1.51680 | 64.2 |
| 15 | −0.68200 | 0.01670 | 2.00100 | 29.1 |
| 16 | 3.32530 | Variable | | |
| 17 | 1.46630 | 0.01530 | 1.48749 | 70.4 |
| 18 | 0.47920 | Variable | | |
| 19 | −51.41050 | 0.06620 | 1.92286 | 20.9 |
| 20 | −0.30720 | 0.01530 | 1.76182 | 26.6 |
| 21 | 0.63490 | 0.01880 | | |
| 22 | 2.83440 | 0.01390 | 1.92286 | 20.9 |
| 23 | 0.57380 | 0.06180 | 1.74400 | 44.8 |
| 24 | −1.32710 | Variable | | |
| 25 | 0.75750 | 0.07490 | 1.59349 | 67.0 |
| 26 | −1.10960 | Variable | | |
| 27 | −1.32300 | 0.01810 | 1.81600 | 46.7 |
| 28 | 0.45580 | 0.05680 | 1.84666 | 23.8 |
| 29 | 1.10530 | (BF) | | |
| Image surface | ∞ | | | |

TABLE 2

(Various data)

| Zooming ratio | 2.71628 | | |
|---|---|---|---|
| | Wide-angle limit | Middle position | Telephoto limit |
| Focal length | 1.0006 | 1.6494 | 2.7179 |
| F-number | 4.18720 | 4.16482 | 4.18341 |
| Half view angle | 16.7820 | 10.2455 | 6.2157 |
| Image height | 0.3020 | 0.3020 | 0.3020 |

TABLE 2-continued (Various data)

| | | | |
|---|---|---|---|
| Overall length of lens system | 1.6742 | 2.2820 | 2.6501 |
| BF | 0.18475 | 0.49311 | 0.61721 |
| d5 | 0.0164 | 0.4616 | 0.7732 |
| d11 | 0.0716 | 0.1190 | 0.0209 |
| d16 | 0.0576 | 0.0139 | 0.0139 |
| d18 | 0.0980 | 0.0958 | 0.1373 |
| d24 | 0.0405 | 0.1252 | 0.2984 |
| d26 | 0.4370 | 0.2051 | 0.0209 |

TABLE 3

(Zoom lens unit data)

| Lens unit | Initial surface No. | Focal length | Overall length of lens unit |
|---|---|---|---|
| 1 | 1 | 1.89141 | 0.15470 |
| 2 | 6 | −0.73896 | 0.13130 |
| 3 | 12 | 0.63318 | 0.14120 |
| 4 | 17 | −1.46766 | 0.01530 |
| 5 | 19 | −10.53512 | 0.17600 |
| 6 | 25 | 0.77002 | 0.07490 |
| 7 | 27 | −0.75033 | 0.07490 |

Numerical Example 2

The zoom lens system of Numerical Example 2 corresponds to Embodiment 2 shown in FIG. 4. Table 4 shows the surface data of the zoom lens system of Numerical Example 2. Table 5 shows the aspherical data. Table 6 shows the various data. Table 7 shows the zoom lens unit data.

TABLE 4

(Surface data)

| Surface number | r | d | nd | vd |
|---|---|---|---|---|
| Object surface | ∞ | | | |
| 1 | 1.93580 | 0.03350 | 1.90366 | 31.3 |
| 2 | 1.29160 | 0.10590 | 1.49700 | 81.6 |
| 3 | 23.21580 | 0.00140 | | |
| 4 | 1.44500 | 0.09650 | 1.49700 | 81.6 |
| 5 | 50.84050 | Variable | | |
| 6 | −59.08650 | 0.01670 | 1.63854 | 55.4 |
| 7 | 0.64470 | 0.06890 | | |
| 8 | −0.68080 | 0.01670 | 1.63854 | 55.4 |
| 9 | 0.82450 | 0.04160 | 1.92286 | 20.9 |
| 10 | 4.34930 | 0.02680 | | |
| 11(Diaphragm) | ∞ | 0.02090 | | |
| 12 | 0.91050 | 0.02910 | 1.92286 | 20.9 |
| 13 | 1.63050 | Variable | | |
| 14* | 3.85660 | 0.05240 | 1.80139 | 45.4 |
| 15 | −0.89700 | 0.01670 | 1.92286 | 20.9 |
| 16 | −2.86650 | 0.00420 | | |
| 17 | 0.89110 | 0.09320 | 1.59282 | 68.6 |
| 18 | −0.83080 | 0.00440 | | |
| 19 | 1.02930 | 0.08500 | 1.49700 | 81.6 |
| 20 | −0.67310 | 0.01670 | 1.92286 | 20.9 |
| 21 | −2.07180 | Variable | | |
| 22 | 7.13980 | 0.01530 | 1.62041 | 60.3 |
| 23 | 0.52020 | Variable | | |
| 24 | 10.43920 | 0.07460 | 1.92286 | 20.9 |
| 25 | −0.43570 | 0.01530 | 1.72825 | 28.3 |
| 26 | 0.82870 | 0.03490 | | |
| 27 | −2.59710 | 0.01390 | 1.90366 | 31.3 |
| 28 | 1.78410 | 0.03520 | | |
| 29 | −1.02610 | 0.02930 | 2.00100 | 29.1 |
| 30 | −0.65350 | Variable | | |
| 31 | 0.88700 | 0.09060 | 1.59349 | 67.0 |
| 32 | −0.69580 | Variable | | |
| 33 | −0.65920 | 0.01810 | 1.83481 | 42.7 |
| 34 | 1.28770 | Variable | | |
| 35 | 0.78490 | 0.08720 | 1.76200 | 40.1 |
| 36 | 13.83380 | (BF) | | |
| Image surface | ∞ | | | |

TABLE 5

(Aspherical data)

Surface No. 14

K = 0.00000E+00, A4 = −1.32554E+00, A6 = 1.31306E+00,
A8 = −7.00923E+01 A10 = 8.82313E+02, A12 = −4.58927E+03

TABLE 6

(Various data)

Zooming ratio  2.71485

| | Wide-angle limit | Middle position | Telephoto limit |
|---|---|---|---|
| Focal length | 1.0005 | 1.6484 | 2.7162 |
| F-number | 2.92639 | 2.91752 | 2.91484 |
| Half view angle | 16.9840 | 10.3040 | 6.2342 |
| Image height | 0.3020 | 0.3020 | 0.3020 |
| Overall length of lens system | 2.0918 | 2.5931 | 3.1381 |
| BF | 0.26221 | 0.45817 | 0.46911 |
| d5 | 0.0164 | 0.5176 | 1.0623 |
| d13 | 0.1379 | 0.0567 | 0.0284 |
| d21 | 0.1301 | 0.1044 | 0.0139 |
| d23 | 0.0651 | 0.0862 | 0.1540 |
| d30 | 0.0938 | 0.0282 | 0.0688 |
| d32 | 0.2219 | 0.0981 | 0.0209 |
| d34 | 0.0194 | 0.0987 | 0.1757 |

TABLE 7

(Zoom lens unit data)

| Lens unit | Initial surface No. | Focal length | Overall length of lens unit |
|---|---|---|---|
| 1 | 1 | 2.16659 | 0.23730 |
| 2 | 6 | −0.75231 | 0.22070 |
| 3 | 14 | 0.49859 | 0.27260 |
| 4 | 22 | −0.90517 | 0.01530 |
| 5 | 24 | −1.77355 | 0.20320 |
| 6 | 31 | 0.67131 | 0.09060 |
| 7 | 33 | −0.52008 | 0.01810 |
| 8 | 35 | 1.08886 | 0.08720 |

Numerical Example 3

The zoom lens system of Numerical Example 3 corresponds to Embodiment 3 shown in FIG. 7. Table 8 shows the surface data of the zoom lens system of Numerical Example 3. Table 9 shows the various data. Table 10 shows the zoom lens unit data.

TABLE 8

(Surface data)

| Surface number | r | d | nd | vd |
|---|---|---|---|---|
| Object surface | ∞ | | | |
| 1 | 2.39670 | 0.03350 | 1.69895 | 30.0 |
| 2 | 1.33760 | 0.11900 | 1.49700 | 81.6 |
| 3 | −15.34530 | 0.00140 | | |
| 4 | 1.19020 | 0.07290 | 1.49700 | 81.6 |
| 5 | 2.56850 | Variable | | |
| 6 | 0.68160 | 0.01950 | 1.48749 | 70.4 |
| 7 | 0.36540 | 0.10280 | | |
| 8 | −0.97890 | 0.01950 | 1.51742 | 52.1 |
| 9 | 0.40910 | 0.10460 | 2.00100 | 29.1 |
| 10 | −3.14310 | 0.02090 | | |
| 11(Diaphragm) | ∞ | 0.11320 | | |
| 12 | −0.56210 | 0.01670 | 1.80000 | 29.8 |
| 13 | 2.11600 | Variable | | |
| 14 | 12.30670 | 0.01950 | 2.00069 | 25.5 |
| 15 | 0.63090 | 0.08590 | 1.59282 | 68.6 |
| 16 | −0.70000 | 0.00140 | | |
| 17 | 1.00470 | 0.05120 | 1.80420 | 46.5 |
| 18 | −2.11860 | Variable | | |
| 19 | −1.05340 | 0.02630 | 2.00100 | 29.1 |
| 20 | −0.68300 | 0.00140 | | |
| 21 | 4.30190 | 0.05290 | 1.49700 | 81.6 |
| 22 | −0.69500 | 0.01950 | 1.80518 | 25.5 |
| 23 | −11.12490 | Variable | | |
| 24 | −8.74590 | 0.06250 | 1.92286 | 20.9 |
| 25 | −0.55180 | 0.01670 | 1.90366 | 31.3 |
| 26 | 0.80860 | Variable | | |
| 27 | 1.02640 | 0.06940 | 2.00100 | 29.1 |
| 28 | −3.04450 | Variable | | |
| 29 | −2.10480 | 0.01950 | 1.69895 | 30.0 |
| 30 | 1.29890 | Variable | | |
| 31 | 1.54060 | 0.04410 | 1.95375 | 32.3 |
| 32 | 10.10170 | (BF) | | |
| Image surface | ∞ | | | |

TABLE 9

(Various data)

Zooming ratio  2.71539

| | Wide-angle limit | Middle position | Telephoto limit |
|---|---|---|---|
| Focal length | 0.9996 | 1.6473 | 2.7144 |
| F-number | 2.92046 | 2.91520 | 2.92092 |
| Half view angle | 17.2278 | 10.3496 | 6.2250 |
| Image height | 0.3020 | 0.3020 | 0.3020 |
| Overall length of lens system | 2.2311 | 2.7813 | 3.2761 |
| BF | 0.15745 | 0.42372 | 0.15694 |
| d5 | 0.0209 | 0.5856 | 1.1007 |
| d13 | 0.1810 | 0.0804 | 0.0209 |
| d18 | 0.1689 | 0.0697 | 0.0300 |
| d23 | 0.1553 | 0.1276 | 0.0218 |
| d26 | 0.1131 | 0.1701 | 0.3323 |
| d28 | 0.3153 | 0.0611 | 0.0209 |
| d30 | 0.0249 | 0.1688 | 0.4983 |

TABLE 10

(Zoom lens unit data)

| Lens unit | Initial surface No. | Focal length | Overall length of lens unit |
|---|---|---|---|
| 1 | 1 | 2.50584 | 0.22680 |
| 2 | 6 | −0.72771 | 0.39720 |
| 3 | 14 | 0.66239 | 0.15800 |
| 4 | 19 | 3.52755 | 0.10010 |
| 5 | 24 | −0.83844 | 0.07920 |
| 6 | 27 | 0.77344 | 0.06940 |
| 7 | 29 | −1.14648 | 0.01950 |
| 8 | 31 | 1.90121 | 0.04410 |

Numerical Example 4

The zoom lens system of Numerical Example 4 corresponds to Embodiment 4 shown in FIG. 10. Table 11 shows the surface data of the zoom lens system of Numerical Example 4. Table 12 shows the aspherical data. Table 13 shows the various data. Table 14 shows the zoom lens unit data.

TABLE 11

(Surface data)

| Surface number | r | d | nd | vd |
|---|---|---|---|---|
| Object surface | ∞ | | | |
| 1 | 1.87530 | 0.03350 | 1.90366 | 31.3 |
| 2 | 1.26990 | 0.10120 | 1.49700 | 81.6 |
| 3 | 17.96860 | 0.00140 | | |
| 4 | 1.42590 | 0.09720 | 1.49700 | 81.6 |
| 5 | 43.60450 | Variable | | |
| 6 | 80.10370 | 0.01670 | 1.63854 | 55.4 |
| 7 | 0.68640 | 0.06550 | | |
| 8 | −0.71550 | 0.01670 | 1.63854 | 55.4 |
| 9 | 0.75390 | 0.04050 | 1.92286 | 20.9 |
| 10 | 2.61960 | 0.03060 | | |
| 11(Diaphragm) | ∞ | 0.02090 | | |
| 12 | 1.02290 | 0.02950 | 1.92286 | 20.9 |
| 13 | 2.28880 | Variable | | |
| 14* | 3.81910 | 0.04800 | 1.80139 | 45.4 |
| 15 | −0.98620 | 0.01670 | 1.92286 | 20.9 |
| 16 | −4.47670 | 0.00280 | | |
| 17 | 0.88400 | 0.09070 | 1.59282 | 68.6 |
| 18 | −0.81540 | 0.00140 | | |
| 19 | 1.04930 | 0.08030 | 1.49700 | 81.6 |
| 20 | −0.68970 | 0.01670 | 1.92286 | 20.9 |
| 21 | −1.97720 | Variable | | |
| 22 | 8.19550 | 0.01530 | 1.62041 | 60.3 |
| 23 | 0.51590 | Variable | | |
| 24 | 6.72020 | 0.07530 | 1.92286 | 20.9 |
| 25 | −0.45450 | 0.01530 | 1.72825 | 28.3 |
| 26 | 0.82690 | 0.03180 | | |
| 27 | −4.88730 | 0.01390 | 1.90366 | 31.3 |
| 28 | 1.39010 | 0.04400 | | |
| 29 | −1.00640 | 0.02750 | 2.00100 | 29.1 |
| 30 | −0.67770 | Variable | | |
| 31 | 0.83690 | 0.08810 | 1.59349 | 67.0 |
| 32 | −0.72300 | Variable | | |
| 33 | −0.65640 | 0.01810 | 1.83481 | 42.7 |
| 34 | 1.11340 | Variable | | |
| 35 | 0.73840 | 0.09620 | 1.76200 | 40.1 |
| 36 | 79.27130 | (BF) | | |
| Image surface | ∞ | | | |

TABLE 12

(Aspherical data)
Surface No. 14

K = 0.00000E+00, A4 = −1.30591E+00,
A6 = 1.29373E+00, A8 = −6.99700E+01
A10 = 8.53665E+02, A12 = −4.21043E+03

TABLE 13

(Various data)

Zooming ratio 2.71550

| | Wide-angle limit | Middle position | Telephoto limit |
|---|---|---|---|
| Focal length | 1.0000 | 1.6481 | 2.7156 |
| F-number | 2.91377 | 2.91433 | 2.92488 |
| Half view angle | 16.7398 | 10.2780 | 6.2222 |
| Image height | 0.3020 | 0.3020 | 0.3020 |
| Overall length of lens system | 2.0220 | 2.5412 | 3.0681 |
| BF | 0.19367 | 0.39907 | 0.41590 |
| d5 | 0.0160 | 0.5170 | 1.0418 |
| d13 | 0.1233 | 0.0533 | 0.0229 |
| d21 | 0.1598 | 0.1161 | 0.0139 |
| d23 | 0.0649 | 0.1085 | 0.2107 |
| d30 | 0.0638 | 0.0333 | 0.0564 |
| d32 | 0.2508 | 0.1197 | 0.0400 |
| d34 | 0.0139 | 0.0584 | 0.1307 |

TABLE 14

(Zoom lens unit data)

| Lens unit | Initial surface No. | Focal length | Overall length of lens unit |
|---|---|---|---|
| 1 | 1 | 2.13640 | 0.23330 |
| 2 | 6 | -0.79636 | 0.22040 |
| 3 | 14 | 0.51206 | 0.25660 |
| 4 | 22 | -0.88809 | 0.01530 |
| 5 | 24 | -1.68779 | 0.20780 |
| 6 | 31 | 0.66762 | 0.08810 |
| 7 | 33 | -0.49237 | 0.01810 |
| 8 | 35 | 0.97762 | 0.09620 |

Numerical Example 5

The zoom lens system of Numerical Example 5 corresponds to Embodiment 5 shown in FIG. 13. Table 15 shows the surface data of the zoom lens system of Numerical Example 5. Table 16 shows the aspherical data. Table 17 shows the various data. Table 18 shows the zoom lens unit data.

TABLE 15

(Surface data)

| Surface number | r | d | nd | vd |
|---|---|---|---|---|
| Object surface | ∞ | | | |
| 1 | 2.08010 | 0.29530 | 1.59349 | 67.0 |
| 2 | 10.38890 | Variable | | |
| 3 | 3.02610 | 0.05660 | 2.00069 | 25.5 |
| 4 | 0.78610 | 0.33790 | | |
| 5* | -2.80650 | 0.04450 | 1.61881 | 63.9 |
| 6* | 2.11510 | 0.00430 | | |
| 7 | 1.52320 | 0.16950 | 1.92049 | 20.4 |
| 8 | -3.44070 | 0.03350 | | |
| 9 | -1.89360 | 0.03010 | 1.93985 | 31.6 |
| 10 | -2.43920 | Variable | | |
| 11 | -1.08360 | 0.03640 | 1.71300 | 53.9 |
| 12 | -4.95280 | Variable | | |
| 13 | 1.24260 | 0.19590 | 1.95375 | 32.3 |
| 14 | -5.24890 | 0.02830 | 1.91285 | 18.6 |
| 15 | -5.77800 | 0.04050 | | |

TABLE 15-continued (Surface data)

| Surface number | r | d | nd | vd |
|---|---|---|---|---|
| 16(Diaphragm) | ∞ | 0.08320 | | |
| 17* | -5.77460 | 0.02830 | 1.77250 | 49.5 |
| 18* | 3.62930 | 0.04050 | | |
| 19 | 0.86250 | 0.27560 | 1.61800 | 63.4 |
| 20 | -1.31230 | 0.02830 | 1.93194 | 23.1 |
| 21 | 1.12040 | 0.02820 | | |
| 22* | 1.12950 | 0.11290 | 1.85135 | 40.1 |
| 23* | -139.70570 | Variable | | |
| 24 | 5.47530 | 0.02830 | 1.80518 | 25.5 |
| 25 | 1.53880 | Variable | | |
| 26 | 0.95210 | 0.34050 | 1.59282 | 68.6 |
| 27 | -1.40710 | 0.02080 | | |
| 28* | -16.27190 | 0.02930 | 1.76801 | 49.2 |
| 29* | 1.52520 | 0.07240 | | |
| 30 | 3.72460 | 0.05730 | 1.70656 | 25.4 |
| 31 | 7.11800 | 0.19660 | | |
| 32 | -0.77810 | 0.02830 | 1.62217 | 62.7 |
| 33 | -21.44740 | Variable | | |
| 34 | 5.15790 | 0.16480 | 1.94595 | 18.0 |
| 35 | -3.36610 | (BF) | | |
| Image surface | ∞ | | | |

TABLE 16

(Aspherical data)

Surface No. 5

K = 0.00000E+00, A4 = 1.99113E-02,
A6 = 3.67766E-02, A8 = 1.45427E-01
A10 = -2.90987E-01

Surface No. 6

K = 0.00000E+00, A4 = -7.04614E-02,
A6 = -4.00806E-03, A8 = -7.44474E-02
A10 = -3.28602E-01

Surface No. 17

K = 0.00000E+00, A4 = 2.20636E-02,
A6 = -1.98617E-02, A8 = 9.51305E-02
A10 = -5.27705E-01

Surface No. 18

K = 0.00000E+00, A4 = -1.99548E-02,
A6 = 5.35999E-02, A8 = -2.02944E-01
A10 = -2.72783E-01

Surface No. 22

K = 0.00000E+00, A4 = -3.89066E-01,
A6 = -9.49243E-02, A8 = -8.66886E-01
A10 = 1.87708E+00

Surface No. 23

K = 0.00000E+00, A4 = 5.93174E-02,
A6 = -2.15146E-01, A8 = 2.50322E-01
A10 = -1.04512E-03

Surface No. 28

K = 0.00000E+00, A4 = -2.09188E-01,
A6 = -2.15261E-01, A8 = 5.66262E-02
A10 = -3.91742E+00

Surface No. 29

K = 0.00000E+00, A4 = 1.89495E-01,
A6 = 2.03738E-02, A8 = 2.29840E+00
A10 = -8.10091E+00

TABLE 17

(Various data)

| Zooming ratio | 2.74588 | | |
|---|---|---|---|
| | Wide-angle limit | Middle position | Telephoto limit |
| Focal length | 0.9999 | 1.6569 | 2.7455 |
| F-number | 2.92252 | 2.92090 | 2.92378 |
| Half view angle | 41.4050 | 26.2253 | 16.1714 |
| Image height | 0.8090 | 0.8090 | 0.8090 |
| Overall length of lens system | 4.4370 | 4.7915 | 5.8229 |
| BF | 0.4842 | 0.8977 | 1.1555 |
| d2 | 0.0202 | 0.3185 | 1.0025 |
| d10 | 0.2496 | 0.2528 | 0.2950 |
| d12 | 0.5669 | 0.2340 | 0.0663 |
| d23 | 0.0417 | 0.0861 | 0.0599 |
| d25 | 0.2467 | 0.0871 | 0.0557 |
| d33 | 0.0202 | 0.1064 | 0.3791 |

TABLE 18

(Zoom lens unit data)

| Lens unit | Initial surface No. | Focal length | Overall length of lens unit |
|---|---|---|---|
| 1 | 1 | 4.32503 | 0.29530 |
| 2 | 3 | −1.75466 | 0.67640 |
| 3 | 11 | −1.95305 | 0.03640 |
| 4 | 13 | 0.99667 | 0.86170 |
| 5 | 24 | −2.66674 | 0.02830 |
| 6 | 26 | 9.79946 | 0.74520 |
| 7 | 34 | 2.17366 | 0.16480 |

Numerical Example 6

The zoom lens system of Numerical Example 6 corresponds to Embodiment 6 shown in FIG. 16. Table 19 shows the surface data of the zoom lens system of Numerical Example 6. Table 20 shows the various data. Table 21 shows the zoom lens unit data.

TABLE 19

(Surface data)

| Surface number | r | d | nd | vd |
|---|---|---|---|---|
| Object surface | ∞ | | | |
| 1 | 1.88670 | 0.02770 | 1.90366 | 31.3 |
| 2 | 1.47620 | 0.11830 | 1.49700 | 81.6 |
| 3 | −24.47620 | 0.00280 | | |
| 4 | 1.88940 | 0.06900 | 1.49700 | 81.6 |
| 5 | 5.94170 | Variable | | |
| 6 | 1.30460 | 0.01120 | 1.59669 | 65.5 |
| 7 | 0.50010 | 0.08610 | | |
| 8 | −0.72310 | 0.01160 | 1.64013 | 32.6 |
| 9 | 0.62800 | 0.05760 | 1.94595 | 18.0 |
| 10 | 2.65740 | 0.04160 | | |
| 11(Diaphragm) | ∞ | Variable | | |
| 12 | 1.38340 | 0.01110 | 1.98339 | 24.5 |
| 13 | 0.50340 | 0.11000 | 1.82918 | 35.6 |
| 14 | −1.25640 | 0.00550 | | |
| 15 | 0.47400 | 0.10440 | 1.78164 | 26.2 |
| 16 | −1.47790 | 0.04250 | 1.81011 | 24.2 |
| 17 | 0.42220 | 0.09800 | | |
| 18 | −0.42850 | 0.01110 | 1.84566 | 23.8 |
| 19 | 66.88480 | 0.01340 | | |
| 20 | 1.65520 | 0.04120 | 1.76565 | 22.3 |
| 21 | −11.25210 | 0.00480 | | |
| 22 | 31.51010 | 0.06300 | 1.85345 | 22.6 |
| 23 | −0.72320 | Variable | | |
| 24 | −21.87790 | 0.01390 | 1.97287 | 22.3 |
| 25 | 0.58150 | 0.11220 | 1.49700 | 81.6 |
| 26 | −0.63630 | 0.00280 | | |
| 27 | 1.11030 | 0.05390 | 1.90069 | 32.3 |
| 28 | −4.63640 | 0.02260 | | |
| 29 | −3.84910 | 0.04000 | 1.94595 | 18.0 |
| 30 | −1.24500 | 0.01110 | 1.72342 | 38.0 |
| 31 | 0.85260 | Variable | | |
| 32 | 0.61970 | 0.06380 | 1.71300 | 53.9 |
| 33 | 4.84270 | Variable | | |
| 34 | −2.00340 | 0.04020 | 1.77051 | 24.8 |
| 35 | −1.01710 | 0.00300 | | |
| 36 | −1.80660 | 0.01190 | 1.82597 | 35.7 |
| 37 | 0.61790 | Variable | | |
| 38 | 1.13780 | 0.07670 | 1.75862 | 25.0 |
| 39 | −6.27170 | (BF) | | |
| Image surface | ∞ | | | |

TABLE 20

(Various data)

| Zooming ratio | 2.69929 | | |
|---|---|---|---|
| | Wide-angle limit | Middle position | Telephoto limit |
| Focal length | 1.0001 | 1.6436 | 2.6997 |
| F-number | 2.90615 | 2.90711 | 2.91261 |
| Half view angle | 16.8803 | 10.1861 | 6.2045 |
| Image height | 0.3000 | 0.3000 | 0.3000 |
| Overall length of lens system | 2.6889 | 3.1802 | 3.6839 |
| BF | 0.60442 | 0.60442 | 0.60442 |
| d5 | 0.0137 | 0.6274 | 1.1342 |
| d11 | 0.2232 | 0.0764 | 0.0138 |
| d23 | 0.1685 | 0.0908 | 0.0137 |
| d31 | 0.0549 | 0.0728 | 0.2065 |
| d33 | 0.2038 | 0.1921 | 0.0434 |
| d37 | 0.0371 | 0.1326 | 0.2842 |
| Entrance pupil position | 0.3442 | 1.4240 | 3.2362 |
| Exit pupil position | −2.3587 | −1.9023 | −2.9697 |
| Front principal points position | 1.0068 | 1.9901 | 3.8969 |
| Back principal points position | 1.6888 | 1.5366 | 0.9842 |

TABLE 21

(Zoom lens unit data)

| Lens unit | Initial surface No. | Focal length | Overall length of lens unit |
|---|---|---|---|
| 1 | 1 | 2.48620 | 0.21780 |
| 2 | 6 | −0.64857 | 0.20810 |
| 3 | 12 | 0.98834 | 0.50520 |
| 4 | 24 | 8.39219 | 0.25660 |
| 5 | 32 | 0.99046 | 0.06380 |
| 6 | 34 | −0.69995 | 0.05510 |
| 7 | 38 | 1.27522 | 0.07670 |

The following Table 22 shows the corresponding values to the individual conditions in the zoom lens systems of each of Numerical Examples.

TABLE 22

(Values corresponding to conditions)

| Condition | | Numerical Example | | | | | |
|---|---|---|---|---|---|---|---|
| | | 1 | 2 | 3 | 4 | 5 | 6 |
| (1) | $BF/f_W$ | 0.18 | 0.26 | 0.16 | 0.19 | 0.48 | 0.60 |
| (2) | $D_A/L_W$ | 0.52 | 0.55 | 0.49 | 0.56 | 0.63 | 0.51 |
| (3) | $D_{AIR}/Y$ | 1.45 | 0.74 | 1.04 | 0.83 | 0.70 | 0.74 |
| (4) | $f_1/f_W$ | 1.89 | 2.17 | 2.51 | 2.14 | 4.33 | 2.49 |
| (5) | $f_2/f_1$ | −0.39 | −0.35 | −0.29 | −0.37 | −0.41 | −0.26 |
| (6) | $|f_3/f_2|$ | 0.86 | 0.66 | 0.91 | 0.64 | 1.11 | 1.52 |
| (7) | $L_T/L_W$ | 1.36 | 1.50 | 1.47 | 1.52 | 1.31 | 1.37 |
| (8) | $vd_1$ | 81.6 | 81.6 | 81.6 | 81.6 | 67.0 | 81.6 |

The present disclosure is applicable to a digital still camera, a digital video camera, a camera for a mobile terminal device such as a smart-phone, a camera for a PDA (Personal Digital Assistance), a surveillance camera in a surveillance system, a Web camera, a vehicle-mounted camera or the like. In particular, the present disclosure is applicable to a photographing optical system where high image quality is required like in a digital still camera system or a digital video camera system.

Also, the present disclosure is applicable to, among the interchangeable lens apparatuses according to the present disclosure, an interchangeable lens apparatus having motorized zoom function, i.e., activating function for the zoom lens system by a motor, with which a digital video camera system is provided.

As described above, embodiments have been described as examples of art in the present disclosure. Thus, the attached drawings and detailed description have been provided.

Therefore, in order to illustrate the art, not only essential elements for solving the problems but also elements that are not necessary for solving the problems may be included in elements appearing in the attached drawings or in the detailed description. Therefore, such unnecessary elements should not be immediately determined as necessary elements because of their presence in the attached drawings or in the detailed description.

Further, since the embodiments described above are merely examples of the art in the present disclosure, it is understood that various modifications, replacements, additions, omissions, and the like can be performed in the scope of the claims or in an equivalent scope thereof.

What is claimed is:

1. A zoom lens system comprising lens units each being composed of at least one lens element,
    the zoom lens system, in order from an object side to an image side, comprising:
    a first lens unit located closest to the object side, and having positive optical power;
    a second lens unit having negative optical power; and
    subsequent five or six lens units, wherein
    an aperture diaphragm is provided,
    intervals between the adjacent lens units vary in zooming from a wide-angle limit to a telephoto limit at a time of image taking,
    the first lens unit moves along an optical axis in the zooming and is fixed with respect to an image surface in focusing from an infinity in-focus condition to a close-object in-focus condition, and
    the following conditions (1), (2), and (3) are satisfied:

$$BF/f_W<0.66 \tag{1}$$

$$D_A/L_W>0.42 \tag{2}$$

$$D_{AIR}/Y<2.00 \tag{3}$$

where

BF is a distance from an apex of an image side surface of a lens element located closest to the image side, to the image surface, $f_W$ is a focal length of the zoom lens system at the wide-angle limit, $D_A$ is a sum of optical axial thicknesses of the lens units in the zoom lens system, $L_W$ is an overall length of the lens system at the wide-angle limit, which is an optical axial distance from an object side surface of a lens element located closest to the object side to the image surface at the wide-angle limit, $D_{AIR}$ is a maximum value of air spaces between the lens elements constituting the lens system at the wide-angle limit, Y is a maximum image height expressed by the following formula:

$$Y = f_T \times \tan(\omega_T),$$

$f_T$ is a focal length of the zoom lens system at the telephoto limit, and $\omega_T$ is a half value (°) of a maximum view angle at the telephoto limit.

2. The zoom lens system as claimed in claim 1, wherein the following condition (4) is satisfied:

$$1.0<f_1/f_W<6.0 \tag{4}$$

where $f_1$ is a focal length of the first lens unit, and $f_W$ is the focal length of the zoom lens system at the wide-angle limit.

3. The zoom lens system as claimed in claim 1, wherein the following condition (5) is satisfied:

$$-0.60<f_2/f_1<-0.20 \tag{5}$$

where $f_1$ is a focal length of the first lens unit, and $f_2$ is a focal length of the second lens unit.

4. The zoom lens system as claimed in claim 1, wherein the following condition (6) is satisfied:

$$0.40<|f_3/f_2|<1.55 \tag{6}$$

where $f_2$ is a focal length of the second lens unit, and $f_3$ is a focal length of a lens unit located closest to the object side, among the subsequent lens units.

5. The zoom lens system as claimed in claim 1, wherein the following condition (7) is satisfied:

$$1.1<L_T/L_W<1.8 \tag{7}$$

where $L_W$ is the overall length of the lens system at the wide-angle limit, which is the optical axial distance from the object side surface of the lens element located closest to the object side to the image surface at the wide-angle limit, and $L_T$ is an overall length of the lens system at the telephoto limit, which is an optical axial distance from the object side surface of the lens element located closest to the object side to the image surface at the telephoto limit.

6. The zoom lens system as claimed in claim 1, wherein a lens element located closest to the image side in the first lens unit satisfies the following condition (8):

$$65.0<vd_1 \tag{8}$$

where vd$_1$ is an Abbe number to a d-line of the lens element located closest to the image side in the first lens unit.

7. The zoom lens system as claimed in claim 1, wherein the aperture diaphragm is located in the second lens unit or in the subsequent lens units, and at least one lens unit among the lens units located on the image side relative to the aperture diaphragm is a focusing lens unit that moves along the optical axis in focusing from the infinity in-focus condition to the close-object in-focus condition.

8. The zoom lens system as claimed in claim 1, wherein the aperture diaphragm is located in the second lens unit or in the subsequent lens units, and at least one lens unit among the lens units located on the image side relative to the aperture diaphragm moves along the optical axis in zooming from the wide-angle limit to the telephoto limit at the time of image taking.

9. The zoom lens system as claimed in claim 1, wherein a lens unit located closest to the image side among the subsequent lens units moves along the optical axis in zooming from the wide-angle limit to the telephoto limit at the time of image taking.

10. The zoom lens system as claimed in claim 1, wherein two selected from a part of the second lens unit and the subsequent lens units are focusing lens units that move along the optical axis in focusing from the infinity in-focus condition to the close-object in-focus condition.

11. The zoom lens system as claimed in claim 1, wherein a focusing lens unit that moves along the optical axis in focusing from the infinity in-focus condition to the close-object in-focus condition is composed of one lens element.

12. The zoom lens system as claimed in claim 1, wherein the first lens unit is composed of three or less lens elements.

13. The zoom lens system as claimed in claim 1, wherein an image blur compensating lens unit that moves in a direction perpendicular to the optical axis in order to optically compensate image blur is included in the second lens unit or in the subsequent lens units, and has negative optical power.

14. The zoom lens system as claimed in claim 1, wherein the aperture diaphragm is located in the second lens unit.

15. An interchangeable lens apparatus comprising:

the zoom lens system as claimed in claim 1; and a lens mount section which is connectable to a camera body including an image sensor for receiving an optical image formed by the zoom lens system and converting the optical image into an electric image signal.

16. A camera system comprising:

an interchangeable lens apparatus including the zoom lens system as claimed in claim 1; and a camera body which is detachably connected to the interchangeable lens apparatus via a camera mount section, and includes an image sensor for receiving an optical image formed by the zoom lens system and converting the optical image into an electric image signal.

\* \* \* \* \*